(12) United States Patent
Szoke, Jr.

(10) Patent No.: US 7,603,781 B1
(45) Date of Patent: Oct. 20, 2009

(54) FOLIAGE TRIMMER WITH ADJUSTABLE CURVATURE OF THE FLEXIBLE CUTTING BLADE ASSEMBLY

(76) Inventor: Anthony A. Szoke, Jr., 523 Cedar St., West Hempstead, NY (US) 11552

( * ) Notice: Subject to any disclaimer, the term of this patent is extended or adjusted under 35 U.S.C. 154(b) by 113 days.

(21) Appl. No.: 11/541,420

(22) Filed: Sep. 29, 2006

Related U.S. Application Data

(63) Continuation-in-part of application No. 11/057,640, filed on Feb. 14, 2005.

(51) Int. Cl.
*B26B 19/06* (2006.01)
*B26B 19/00* (2006.01)

(52) U.S. Cl. .............................. 30/199; 30/208; 30/221; 30/223; 30/277.4

(58) Field of Classification Search .................... 30/194, 30/199, 208, 210–213, 216, 221, 223, 234, 30/392–394, 277.4
See application file for complete search history.

(56) References Cited

U.S. PATENT DOCUMENTS

| | | | |
|---|---|---|---|
| 3,487,614 A | 1/1970 | Uhor | |
| 3,913,304 A | 10/1975 | Jodoin | |
| 4,970,791 A * | 11/1990 | Vergara | ........................ 30/216 |
| 6,151,876 A | 11/2000 | Van Der Burg | |
| 2004/0103631 A1 | 6/2004 | Ezendam et al. | |

* cited by examiner

*Primary Examiner*—Boyer D. Ashley
*Assistant Examiner*—Edward Landrum

(57) ABSTRACT

Foliage trimmer with adjustable curvature of the flexible cutting blade assembly for the purpose of cutting convex shapes comprising of a trimmer body with pivotally mounted handle mechanism attached to a flexible curvature adjuster band with a uniform curvature maintainer mechanism attached to trimmer body to maintain equidistant spacing between the bolt axis and to prevent the formation of a ununiform curvature. The curvature of the flexible cutting blade assembly is adjusted with the release of the restraining mechanism with the fingers of the hand that also adjusts the pivotal movement of the front handle mechanism. The flexible cutting blades of the flexible cutting blade assembly are linearly reciprocated via resilient flexible cams of the drive mechanism connected to the motor means located in trimmer body.

4 Claims, 29 Drawing Sheets

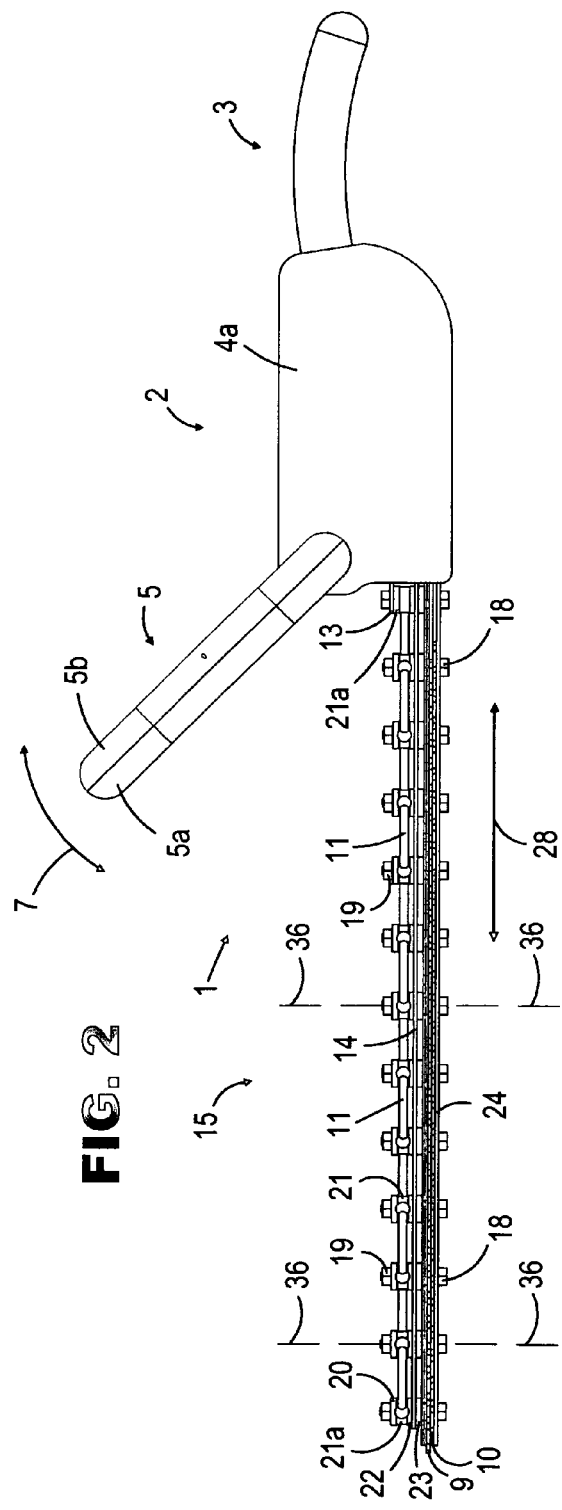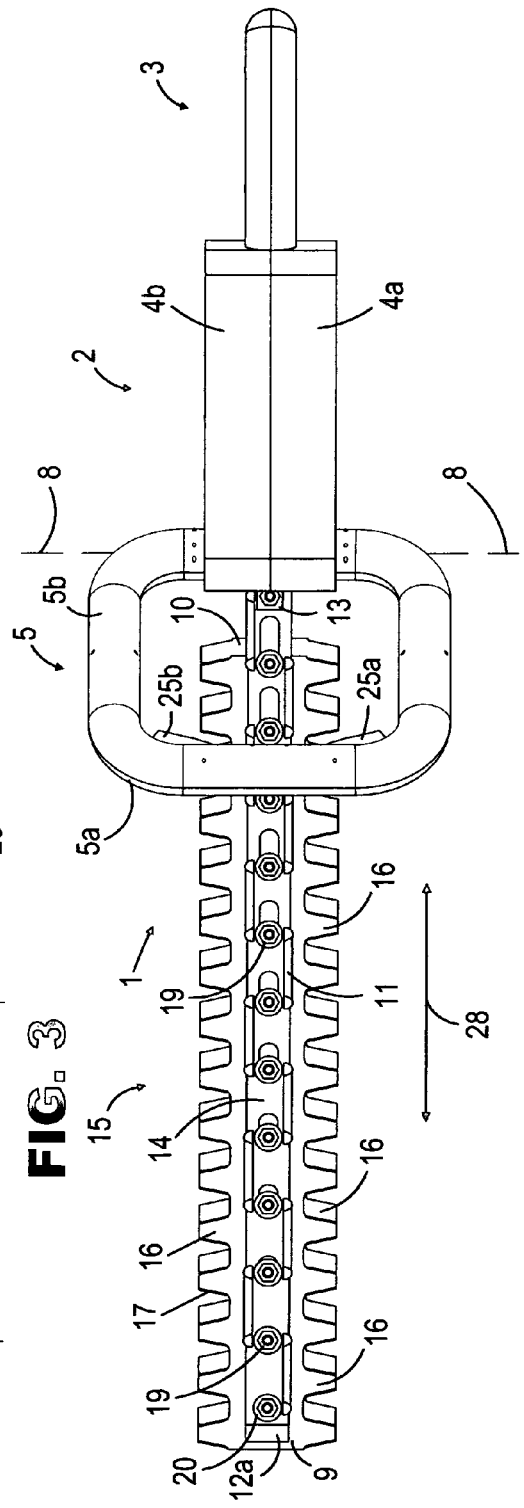

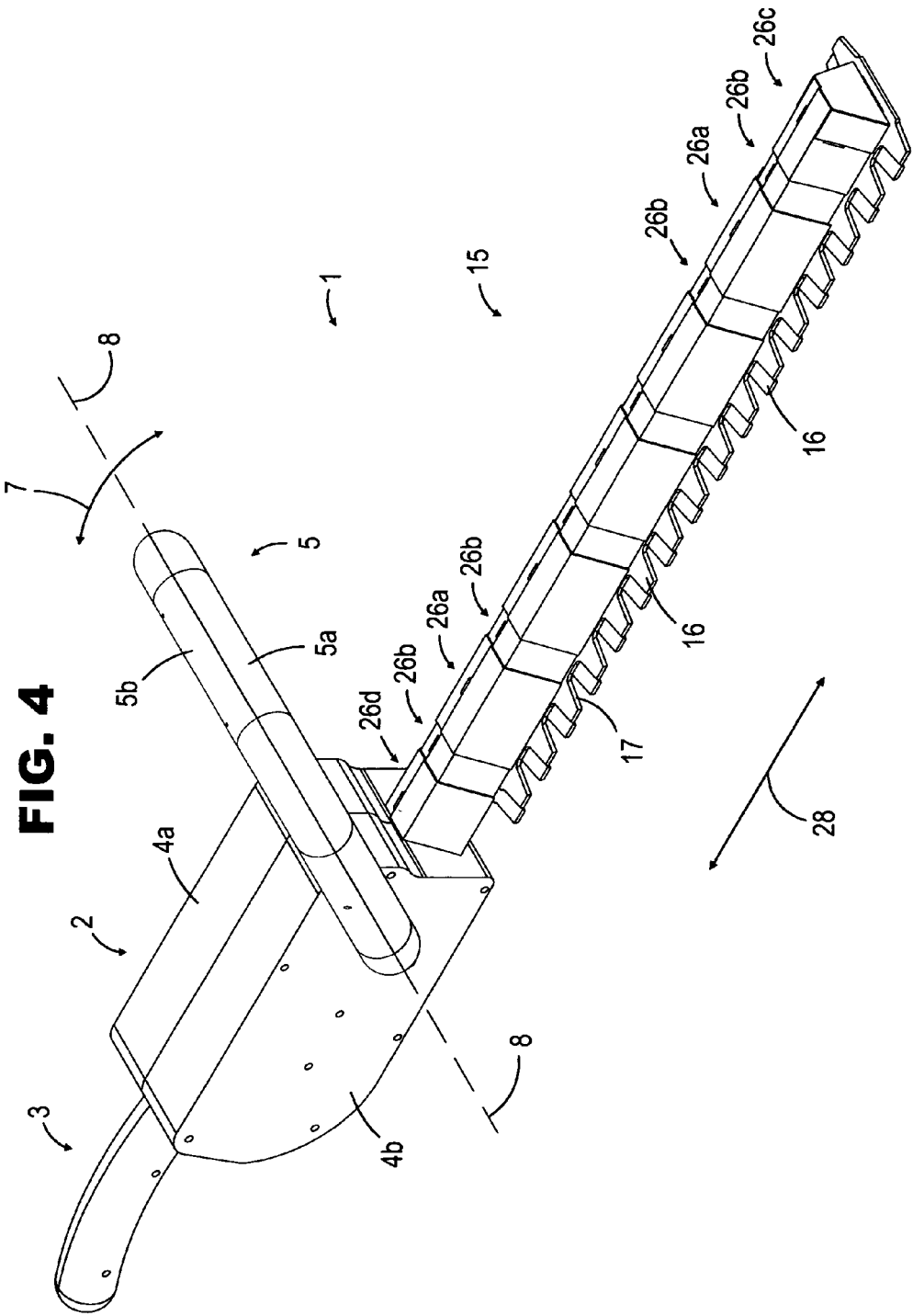

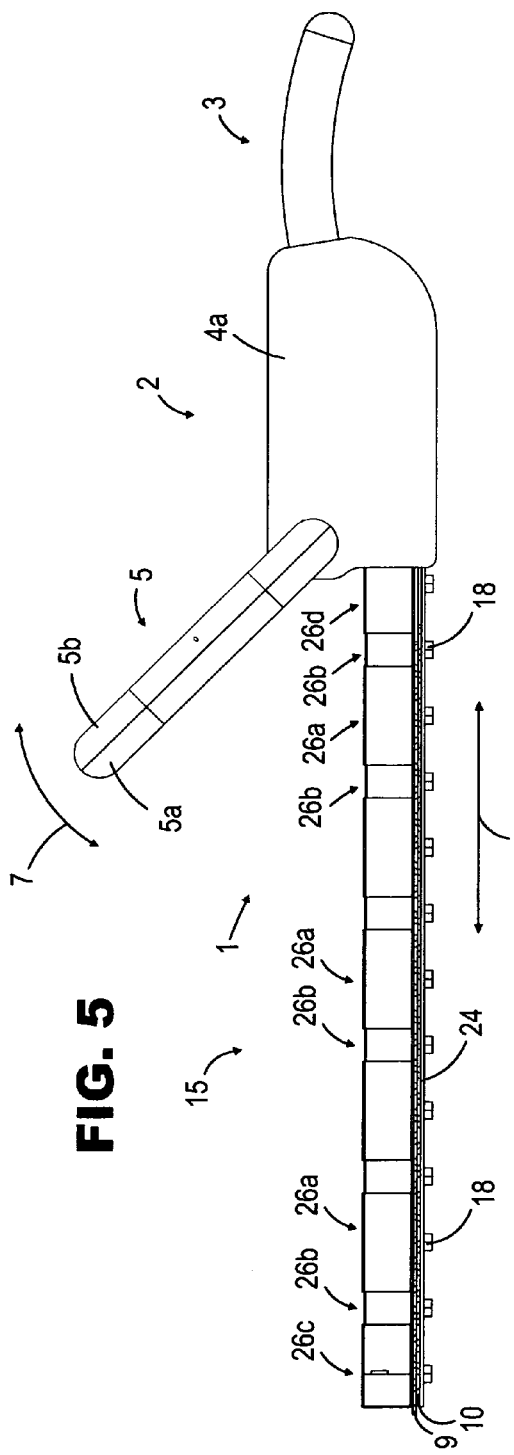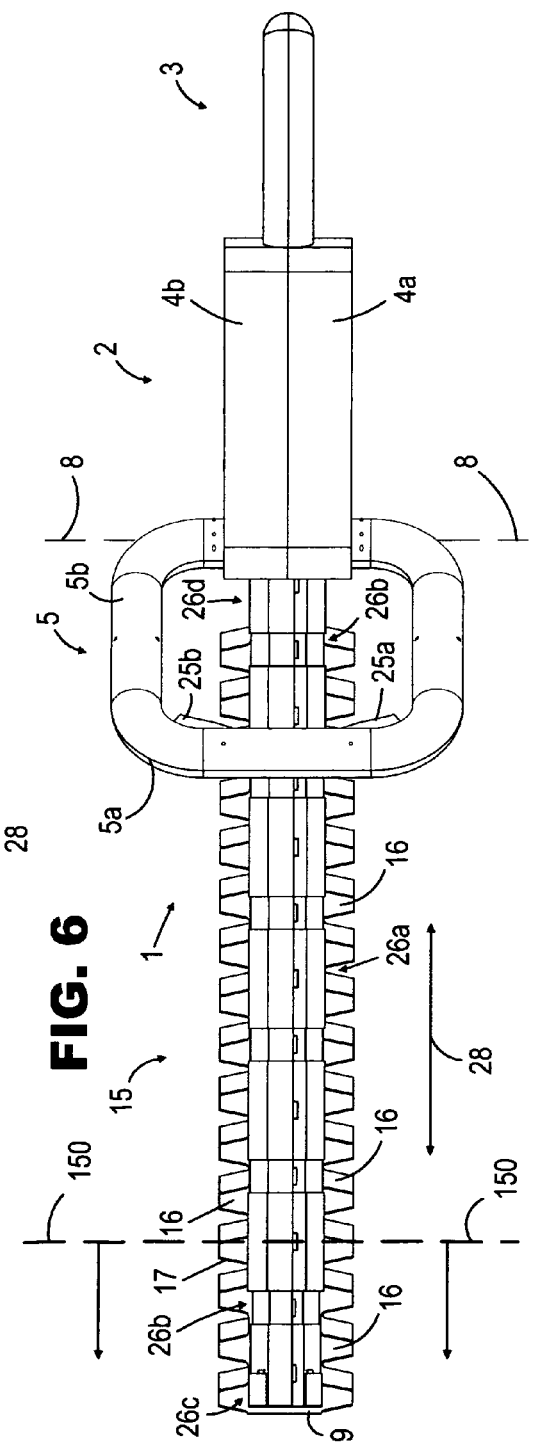

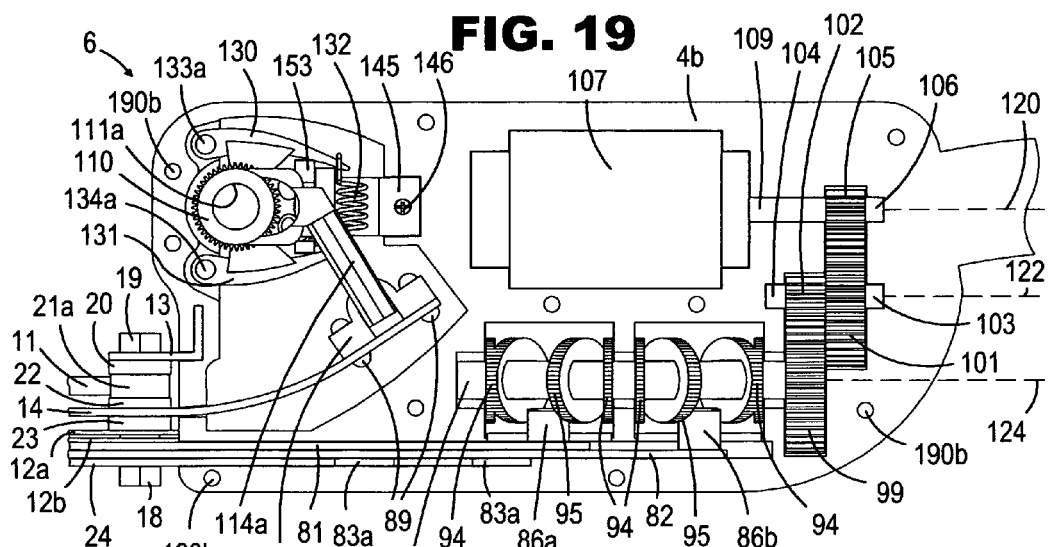
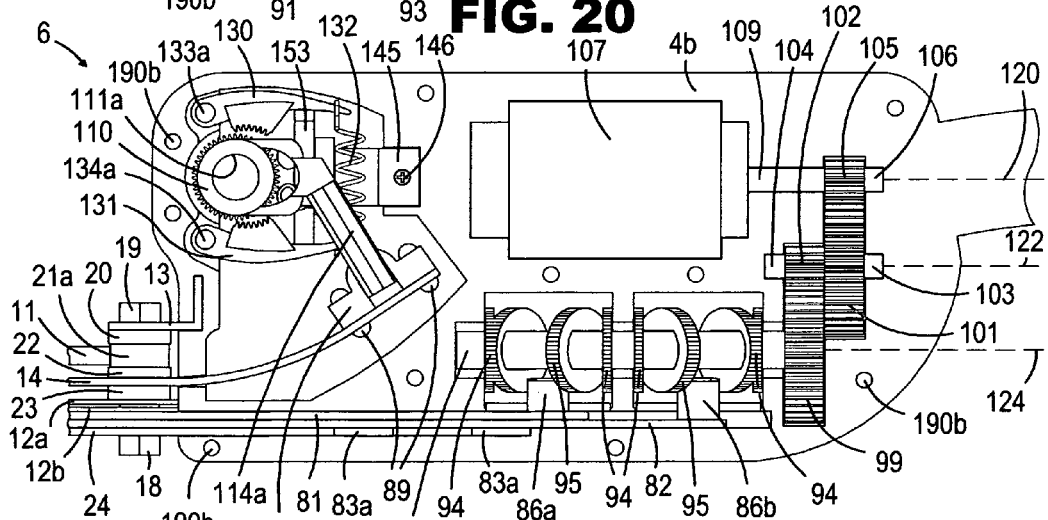
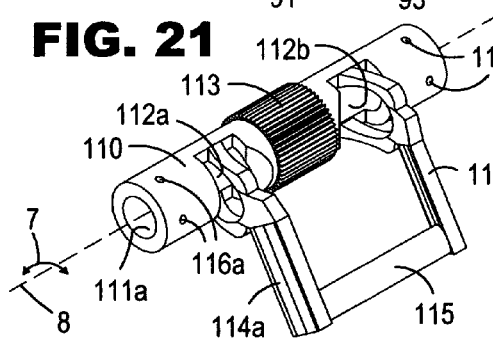
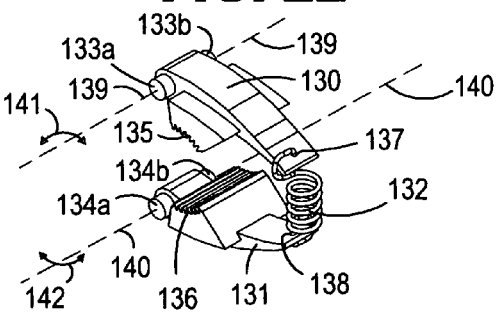

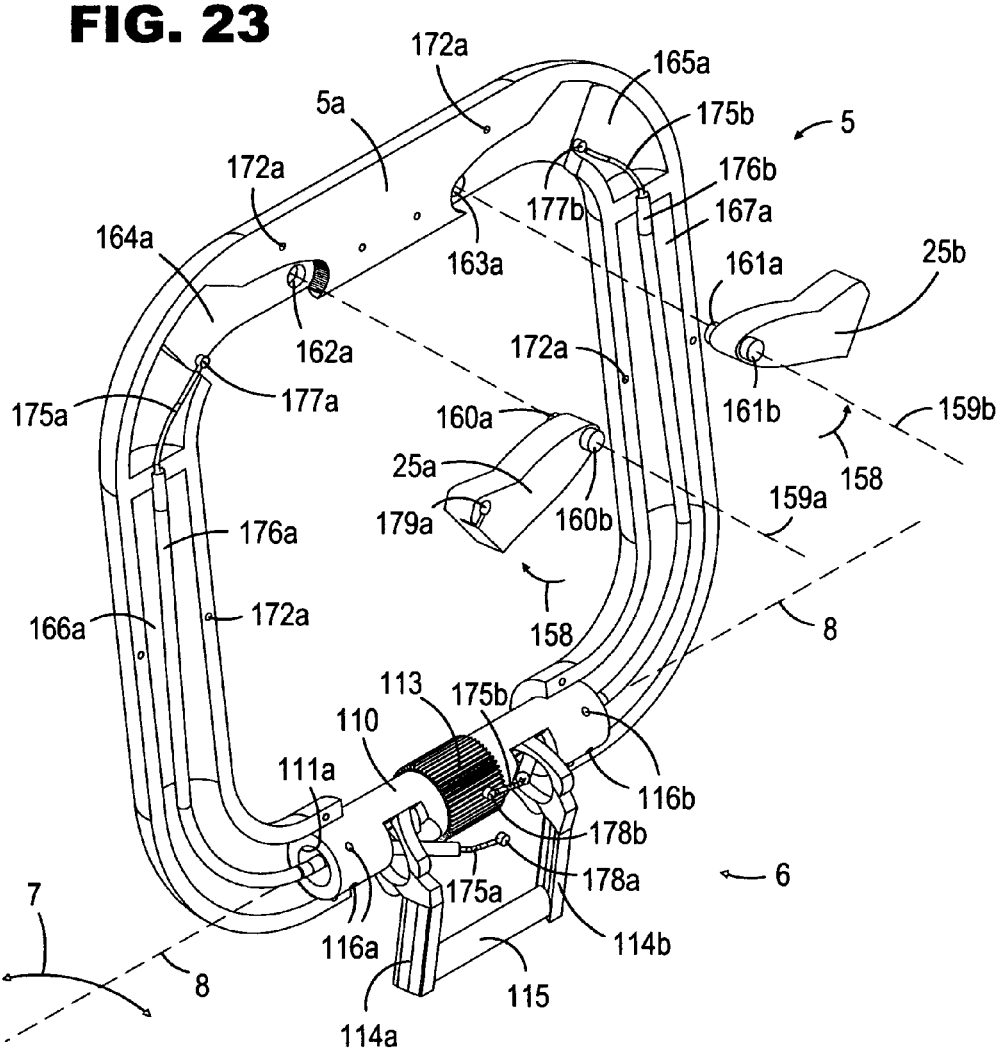
FIG. 23
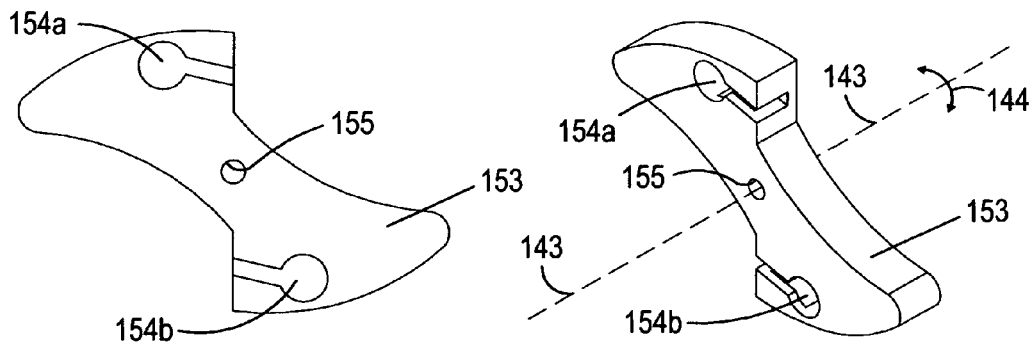
FIG. 24 FIG. 25

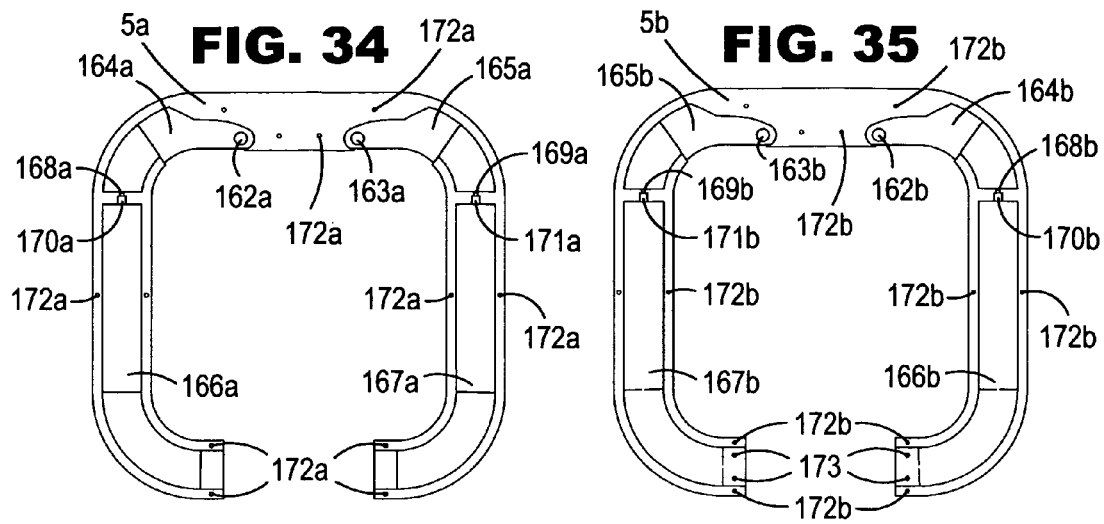
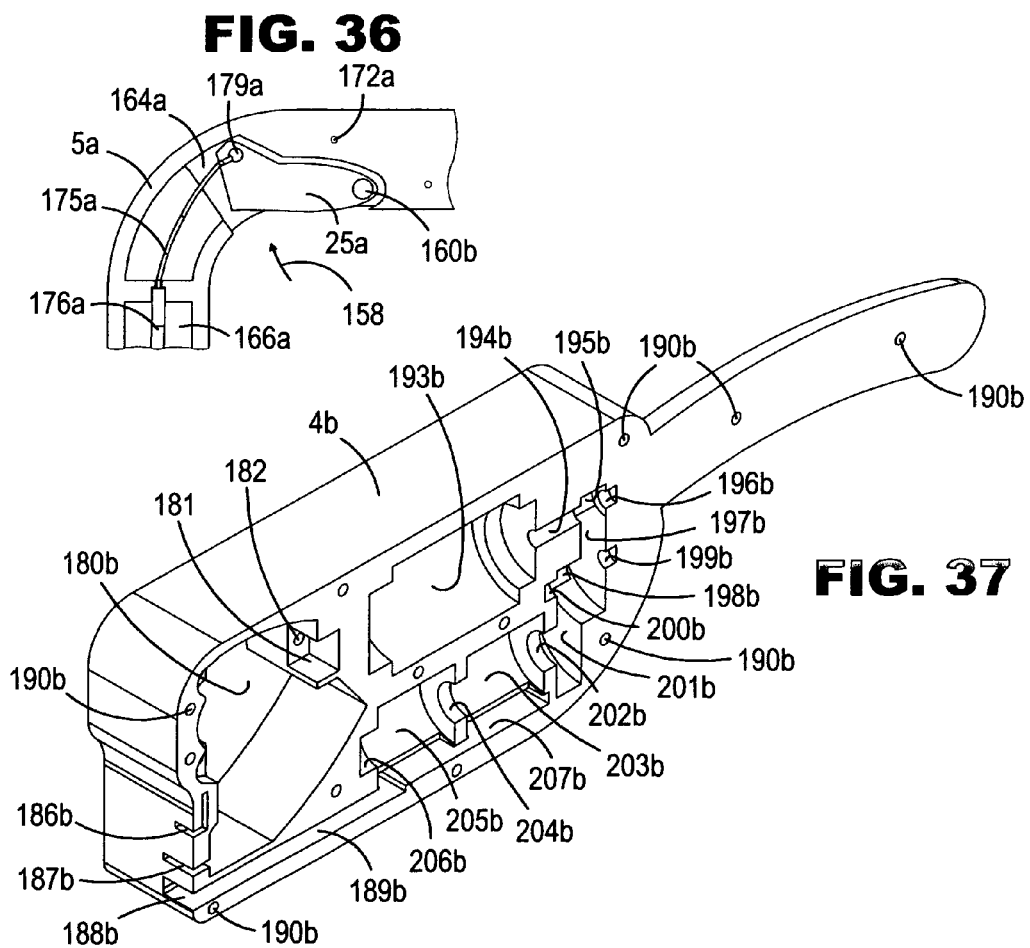

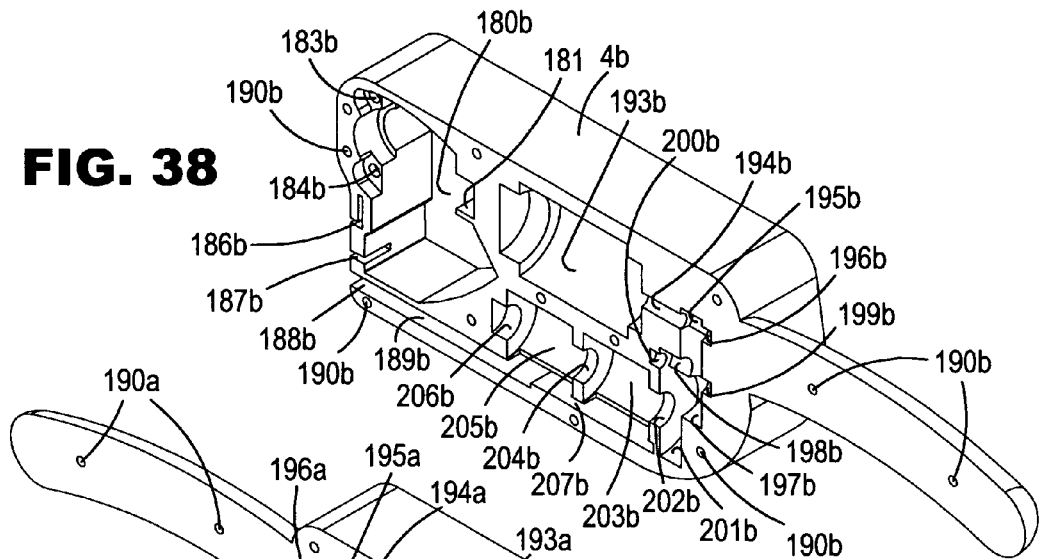
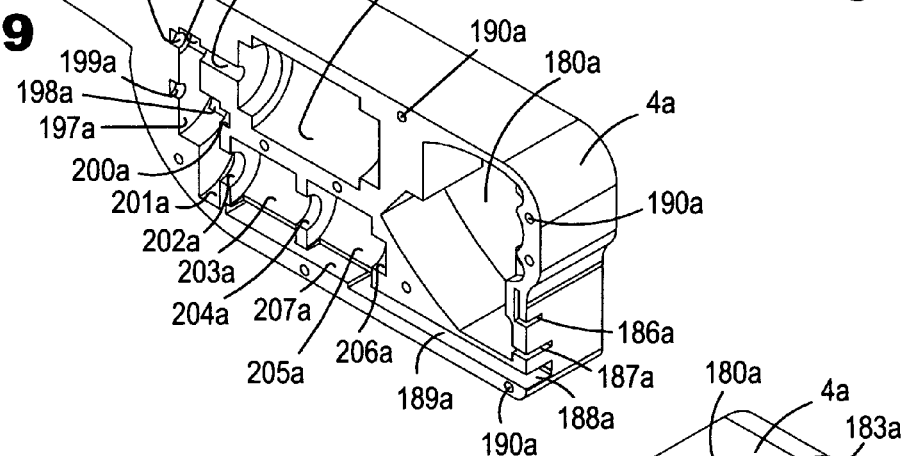
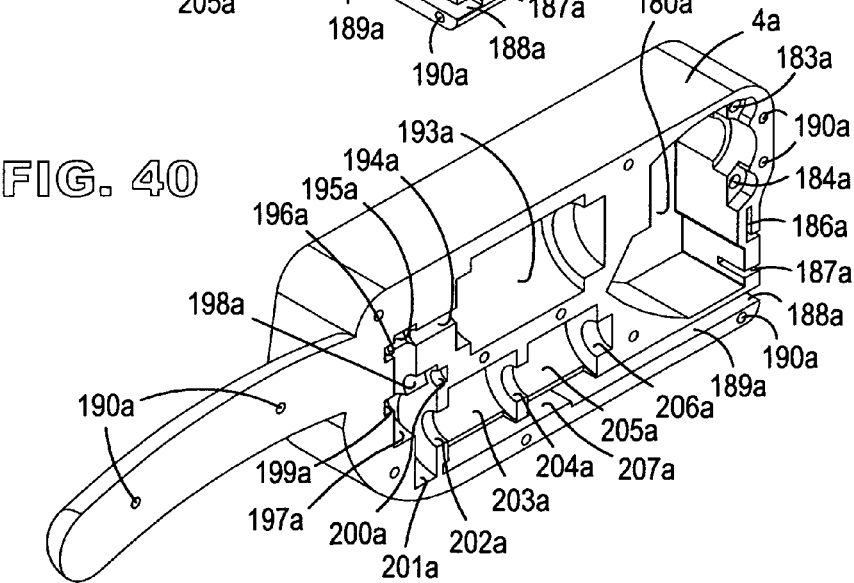

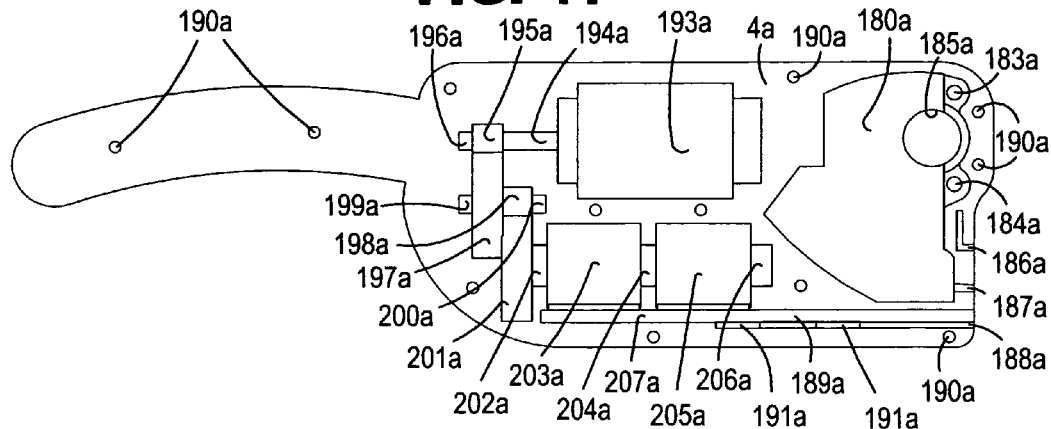
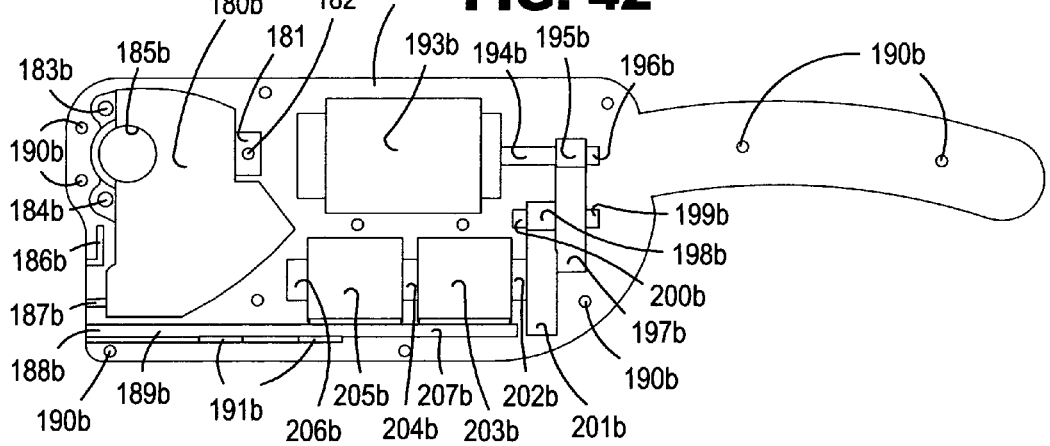
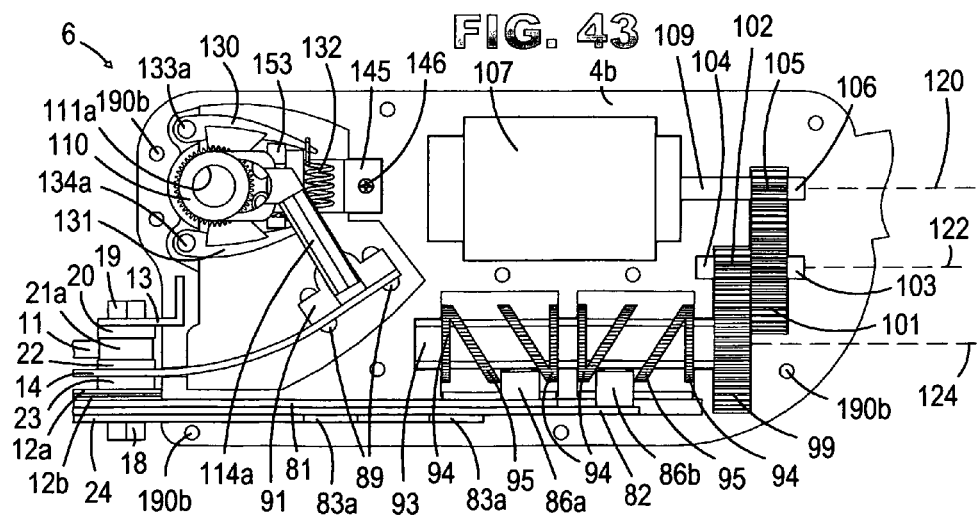

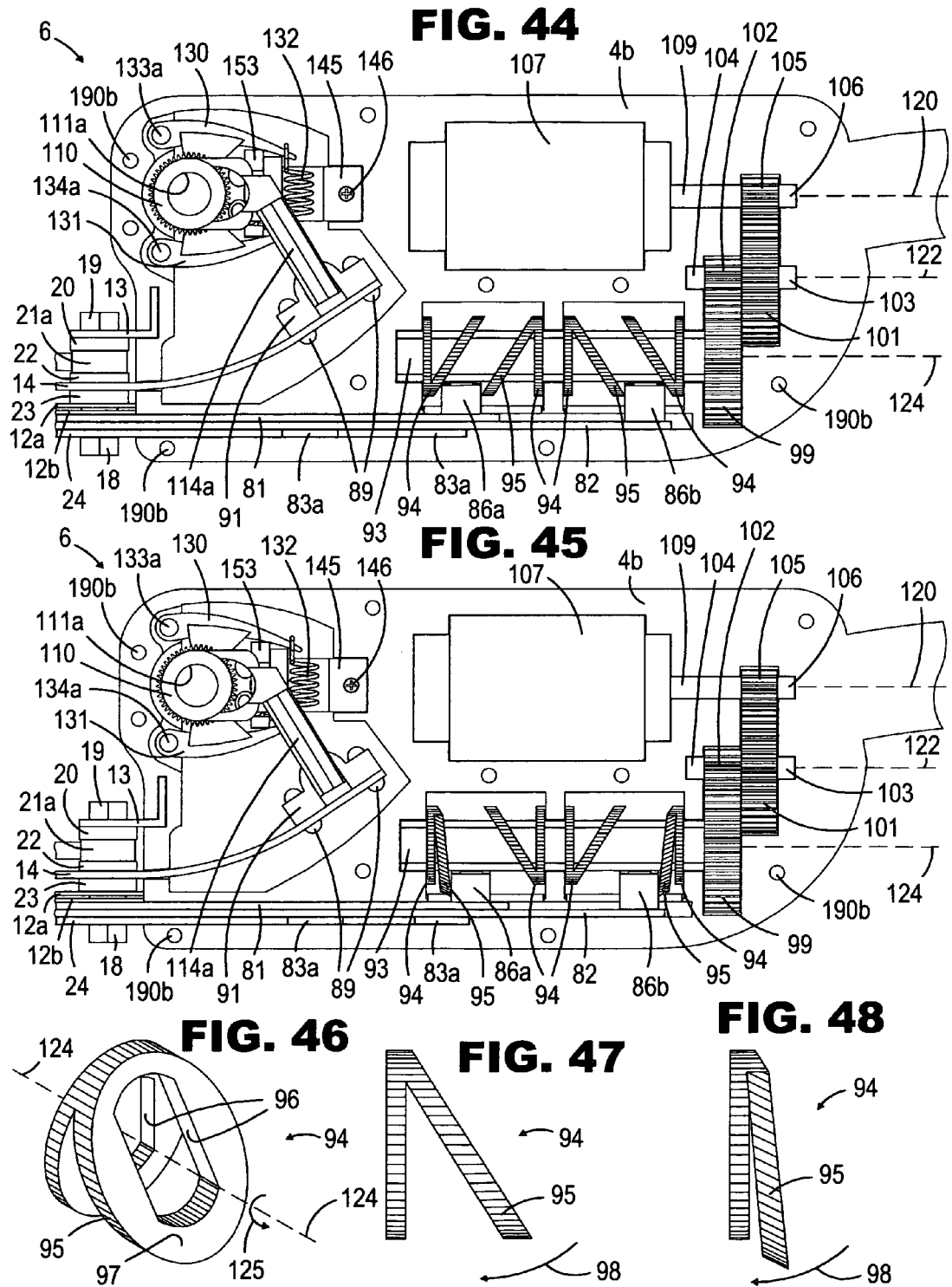

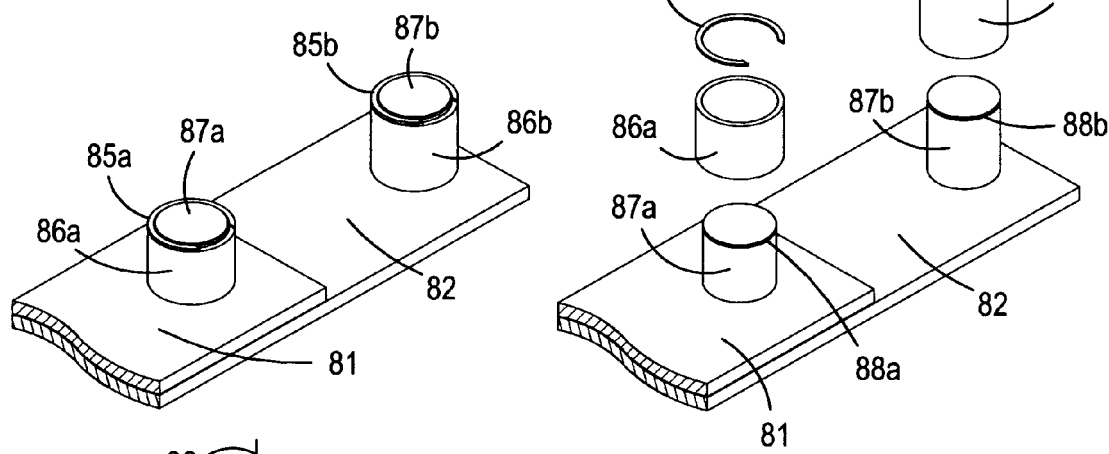
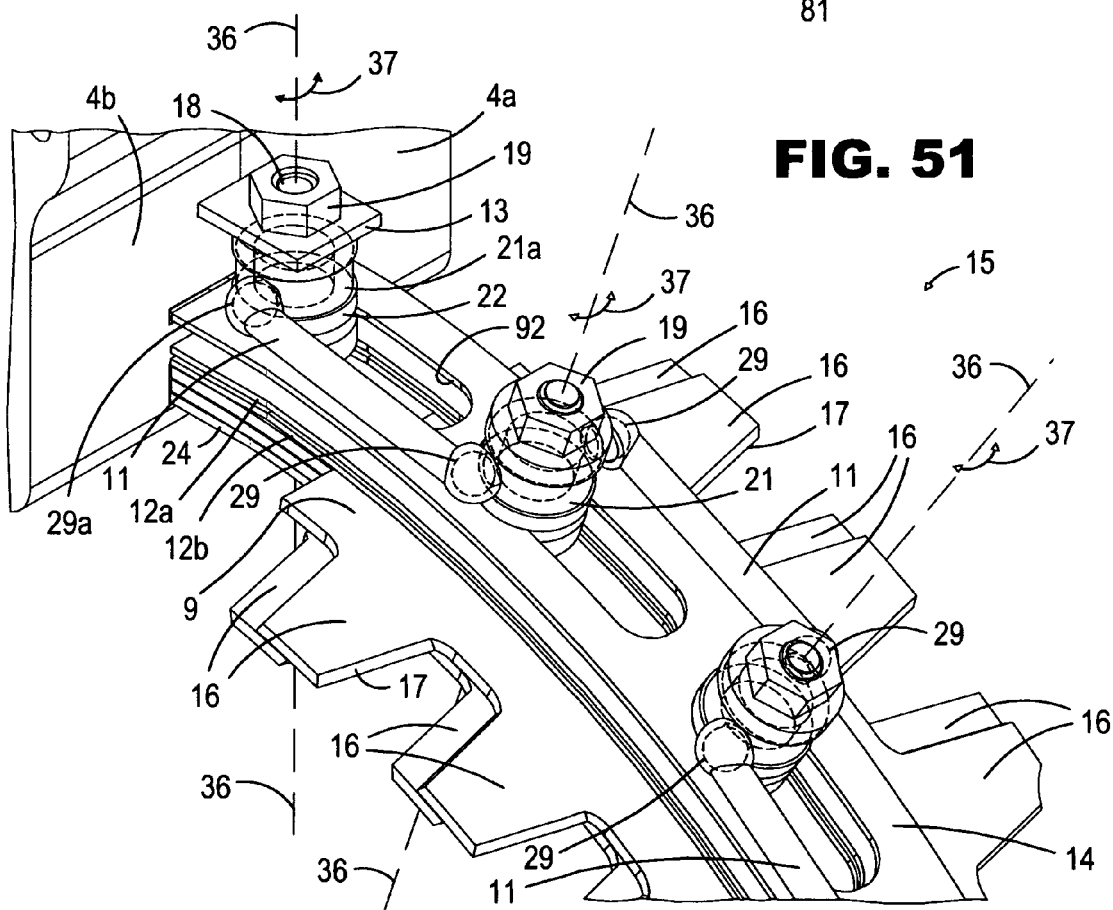

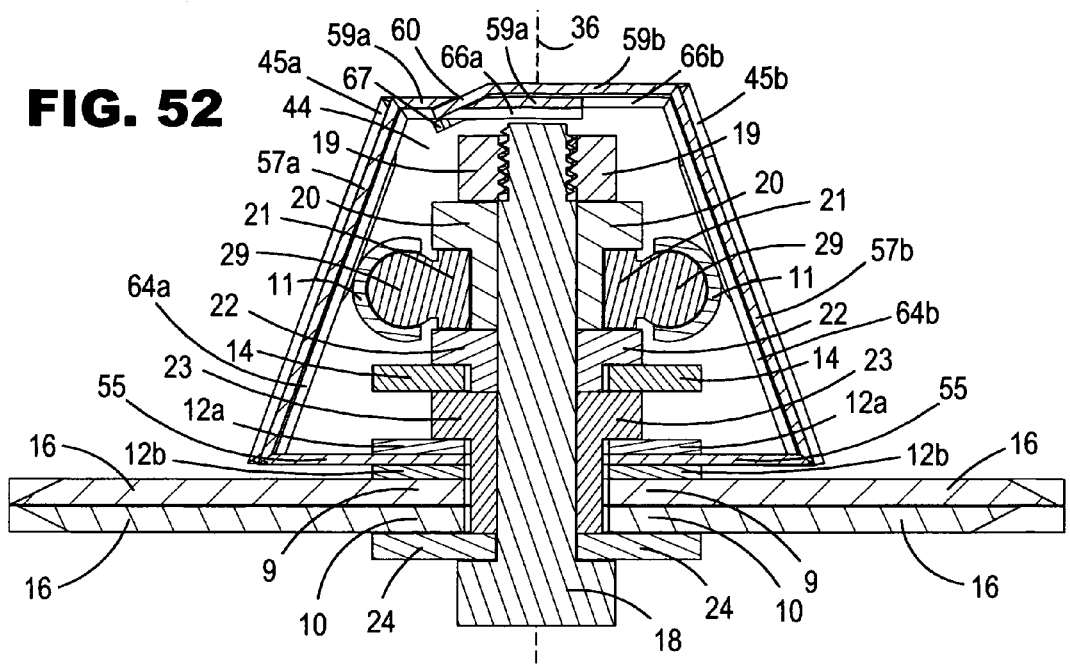
FIG. 52
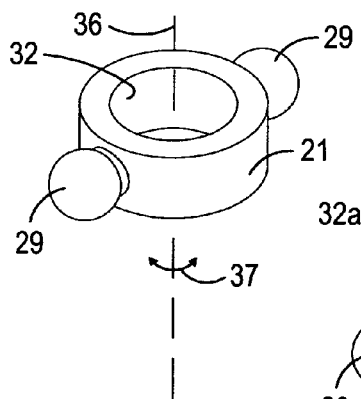
FIG. 53
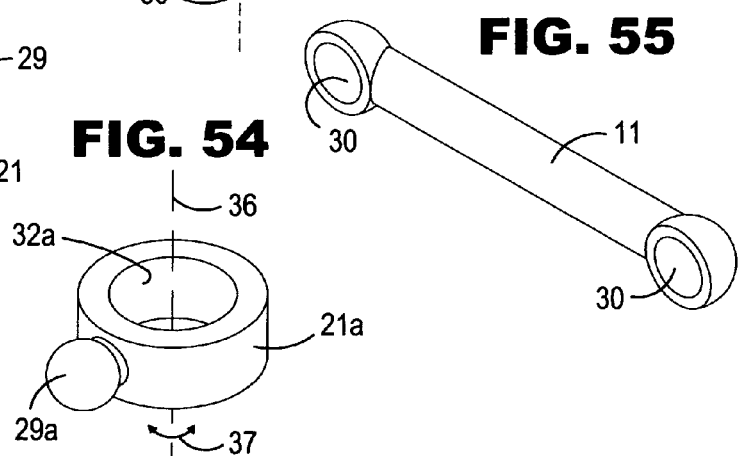
FIG. 54
FIG. 55
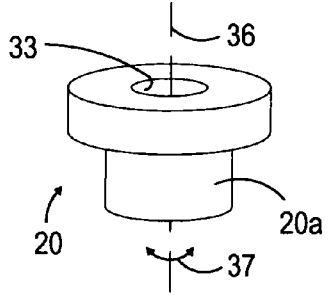
FIG. 56
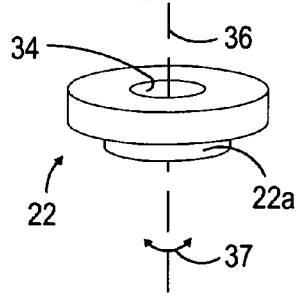
FIG. 57
FIG. 58

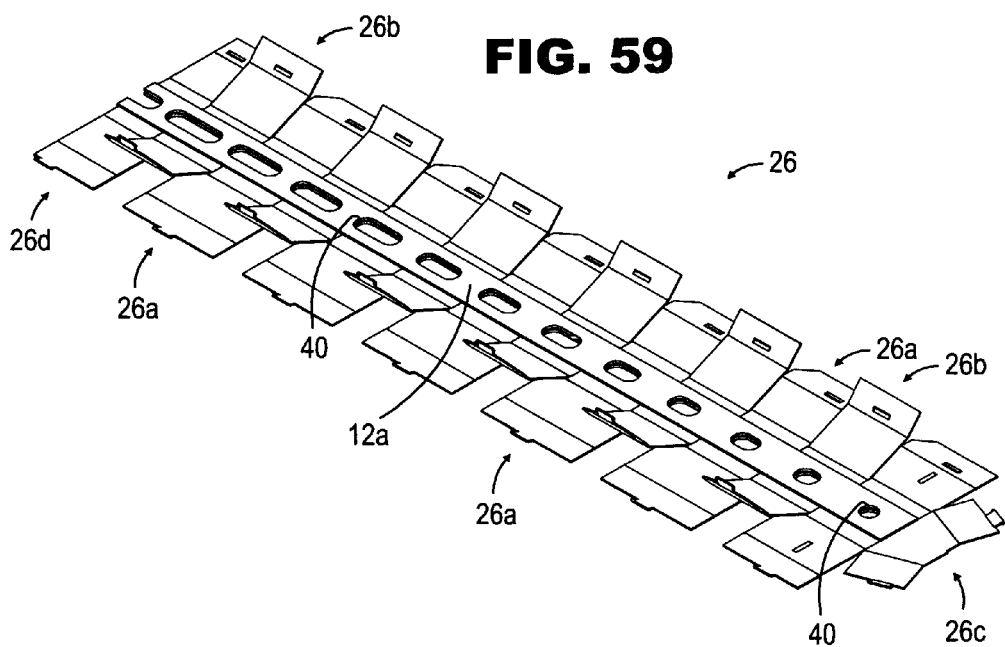
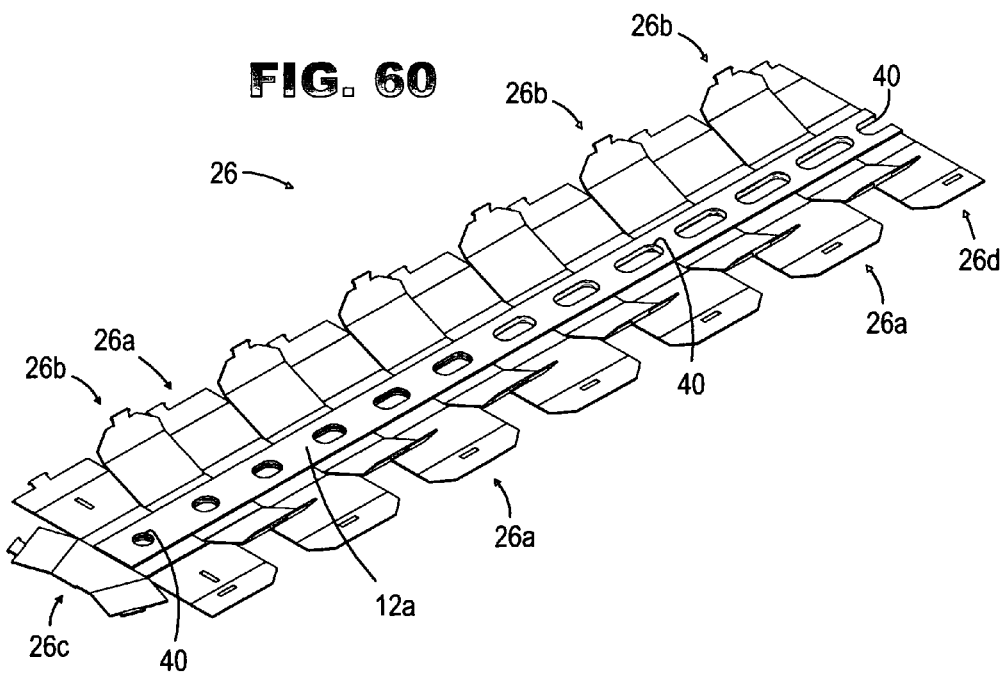

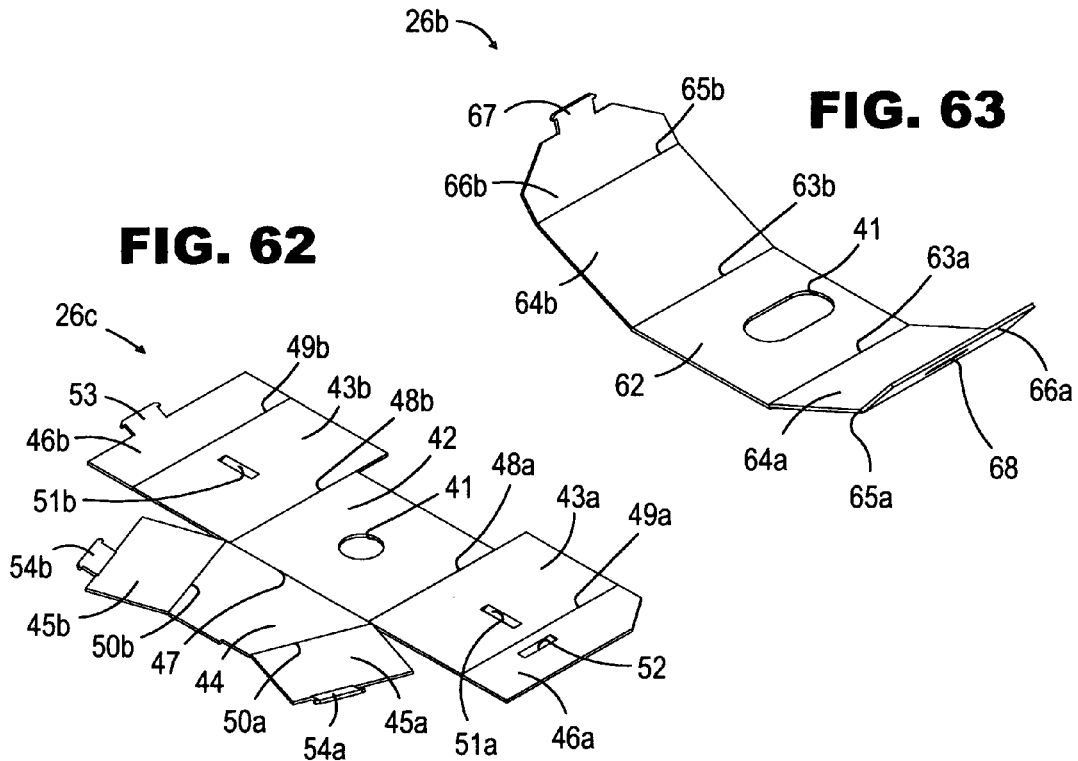

FOLIAGE TRIMMER WITH ADJUSTABLE CURVATURE OF THE FLEXIBLE CUTTING BLADE ASSEMBLY

CROSS REFERENCE TO RELATED APPLICATIONS

The present invention is a continuation-in-part of U.S. patent application Ser. No. 11/057,640 entitled "FOLIAGE TRIMMERS WITH ADJUSTABLE CURVATURE OF CUTTING SECTIONS", filed on Feb. 14, 2005.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to foliage trimmers designed for cutting the leaves and branches of asymmetrically convex plants, bushes, shrubs, hedges and the like. Trimming asymmetrically convex shrubs, or the like, manually to a desired shape is very arduous and time consuming operation.

There have been attempts in the past to invent a device to cut convex shapes. Examples of such foliage trimming devices are shown in U.S. Pat. No. 3,487,614, invented by E. Uhor; and U.S. Pat. No. 3,913,304, invented by Paul Jodoin; and U.S. Pat. No. 4,970,791, invented by Florentino S. Vergara; and U.S. Pat. No. 6,151,876, invented by William Van Der Burg; and U.S. Pat. Application No. US 2004/0103631 A1, invented by Jan Pontianus Ezendam and Nicodemus Assisius Ezendam. Unfortunately all these inventions are designed to cut symmetrically convex shapes, thus they are useless in everyday gardens that are made up of asymmetrically convex bushes and furthermore the gardens are not created to accommodate the machinery associated with these trimmers.

Therefore landscapers and others still use conventional linear trimmers that cut in a flat linear plane to trim asymmetrically convex shrubs and the like. Conventional linear foliage trimmers comprise of two straight flat blades situated in facial engagement, with overlapped teeth protruding along their registering edges. A motor means is arranged at one end of the blade assembly to move one of the blades reciprocally or both blades counter reciprocally so the registering teeth slide across one another to cut the foliage projecting through the spaces between the teeth.

In order to cut asymmetrically convex shapes, it is necessary to periodically adjust the angle between the conventional linear trimmer blade assembly and the foliage surface. And multiple passes have to be made to create an asymmetrically convex contour. In many cases the conventional linear trimmer cuts into the foliage contour or creates a flat spot, thus requiring removal of more foliage than is desired. The final condition of the foliage is often not what was initially intended.

BRIEF SUMMARY OF THE INVENTION

The present invention is designed to be a foliage trimmer that can cut asymmetrically convex shapes in such a way that the curvature of the trimmer's flexible cutting blade assembly determines the final contour of the foliage being trimmed. It is not necessary to make multiple passes, with different angular orientation, with the trimmer in order to create a convex foliage contour. One pass with the trimmer will create a convex foliage contour within the width of the trimmer's flexible cutting blade assembly.

The preferred embodiments of the invention comprises of a trimmer body with pivotally mounted handle mechanism attached to a flexible curvature adjuster band with a uniform curvature maintainer mechanism attached to trimmer body to maintain equidistant spacing between the bolt axis and to prevent the formation of a ununiform curvature. The curvature of the flexible cutting blade assembly is adjusted with the release of the restraining mechanism with the fingers of the hand that also adjusts the pivotal movement of the front handle mechanism. The flexible cutting blades of the flexible cutting blade assembly are linearly reciprocated via resilient flexible cams of the drive mechanism connected to the motor means located in trimmer body. The resilient flexible cams are designed and formed from materials that allow flexing and deflecting of the resiliently flexible members only when a resistance force greater than what is required to cut normal foliage is transferred through the teeth of the flexible cutting blades. A flexible debris cover is situated as part of the flexible cutting blade assembly to protect the curvature maintainer mechanism and curvature adjuster band from debris.

BRIEF DESCRIPTION OF THE SEVERAL VIEWS OF THE DRAWING

FIG. 2 is a side elevational view of the foliage trimmer having the flexible cutting blade assembly in the linear position.

FIG. 3 is a plan view of the foliage trimmer having the flexible cutting blade assembly in the linear position.

FIG. 4 is a front perspective view of the foliage trimmer having the flexible cutting blade assembly in the linear position with the debris cover attached.

FIG. 5 is a side elevational view of the foliage trimmer having the flexible cutting blade assembly in the linear position with the debris cover attached.

FIG. 6 is a plan view of the foliage trimmer having the flexible cutting blade assembly in the linear position with the debris cover attached.

FIG. 19 is a side elevational view of the foliage trimmer body showing the curvature adjusting mechanism with the restraining mechanism in the locked position and without the left housing and without the front handle.

FIG. 20 is a side elevational view of the foliage trimmer body showing the curvature adjuster mechanism with the restraining mechanism in the unlocked position and without the left housing and without the handle.

FIG. 21 is a rear perspective view of the tubular adjuster member.

FIG. 22 is a rear perspective view showing the upper and lower restraining arms with the springs attached.

FIG. 23 is a rear perspective view of the front half of the front handle with its internal parts and the tubular adjuster member.

FIG. 24 is a rear elevational view of the rotating separator member.

FIG. 25 is a rear perspective view of the rotating separator member.

FIG. 34 is a rear elevational view of the front half section of the front handle.

FIG. 35 is a front elevational view of the rear half section of the front handle.

FIG. 36 is a fragmentary rear elevational view showing the left release lever in the depressed position and without the rear half section of the front handle.

FIG. 37 is a front perspective view of right clamshell of the foliage trimmer body.

FIG. 38 is a rear perspective view of right clamshell of the foliage trimmer body.

FIG. 39 is a front perspective view of left clamshell of the foliage trimmer body.

FIG. 40 is a rear perspective view of left clamshell of the foliage trimmer body.

FIG. 41 is a side elevational view of left clamshell of the foliage trimmer body.

FIG. 42 is a side elevational view of right clamshell of the foliage trimmer body.

FIG. 43 is a side elevational view of the foliage trimmer body showing the curvature adjuster mechanism with the restraining mechanism in the locked position and without the left housing and without the front handle and also showing the upper flexible cutting blade positioned all the way to the rear and the lower flexible cutting blade positioned all the way to the front.

FIG. 44 is a side elevational view of the foliage trimmer body showing the curvature adjuster mechanism with the restraining mechanism in the locked position and without the left housing and without the front handle and also showing the upper flexible cutting blade positioned all the way to the front and the lower flexible cutting blade positioned all the way to the rear.

FIG. 45 is a side elevational view of the foliage trimmer body showing the curvature adjuster mechanism with the restraining mechanism in the locked position and without the left housing and without the front handle and also showing the upper flexible cutting blade positioned all the way to the front and the lower flexible cutting blade positioned all the way to the rear with flexible cams being bent due to an obstruction between the cutting teeth of the flexible cutting blades.

FIG. 46 is a perspective view of the flexible cam.

FIG. 47 is a side elevational view of the flexible cam.

FIG. 48 is a side elevational view of the flexible cam with the flexible member in the bent position.

FIG. 49 is a front fragmentary perspective view of the tangs of upper and lower flexible cutting blades with driving pins, bushings and flat retaining rings secured.

FIG. 50 is a front fragmentary perspective view of the tangs of upper and lower cutting blades with driving pins, bushings and flat retaining rings separated.

FIG. 51 is a front fragmentary perspective close-up view of the flexible cutting blade assembly of the foliage trimmer in the semi circular position showing the mechanism that maintains the uniform curvature.

FIG. 52 is cross sectional view of the flexible cutting blade assembly taken on line 150-150 of FIG. 6.

FIG. 53 is a perspective view of the rotating connector.

FIG. 54 is a perspective view of the outermost rotating connector.

FIG. 55 is a perspective view of the linear link.

FIG. 56 is a perspective view of the upper spacer.

FIG. 57 is a perspective view of the middle spacer.

FIG. 58 is a perspective view of the lower spacer.

FIG. 59 is a front perspective view of the debris cover in the unfolded position.

FIG. 60 is another front perspective view of the debris cover in the unfolded position.

FIG. 62 is a perspective view of the front debris cover section in the unfolded position.

FIG. 63 is a perspective view of the primary intermediate debris cover section in the unfolded position.

FIG. 64 is a perspective view of the secondary intermediate debris cover section in the unfolded position.

FIG. 65 is a perspective view of the rear debris cover section in the unfolded position.

DETAILED DESCRIPTION OF THE INVENTION

Figure 1:
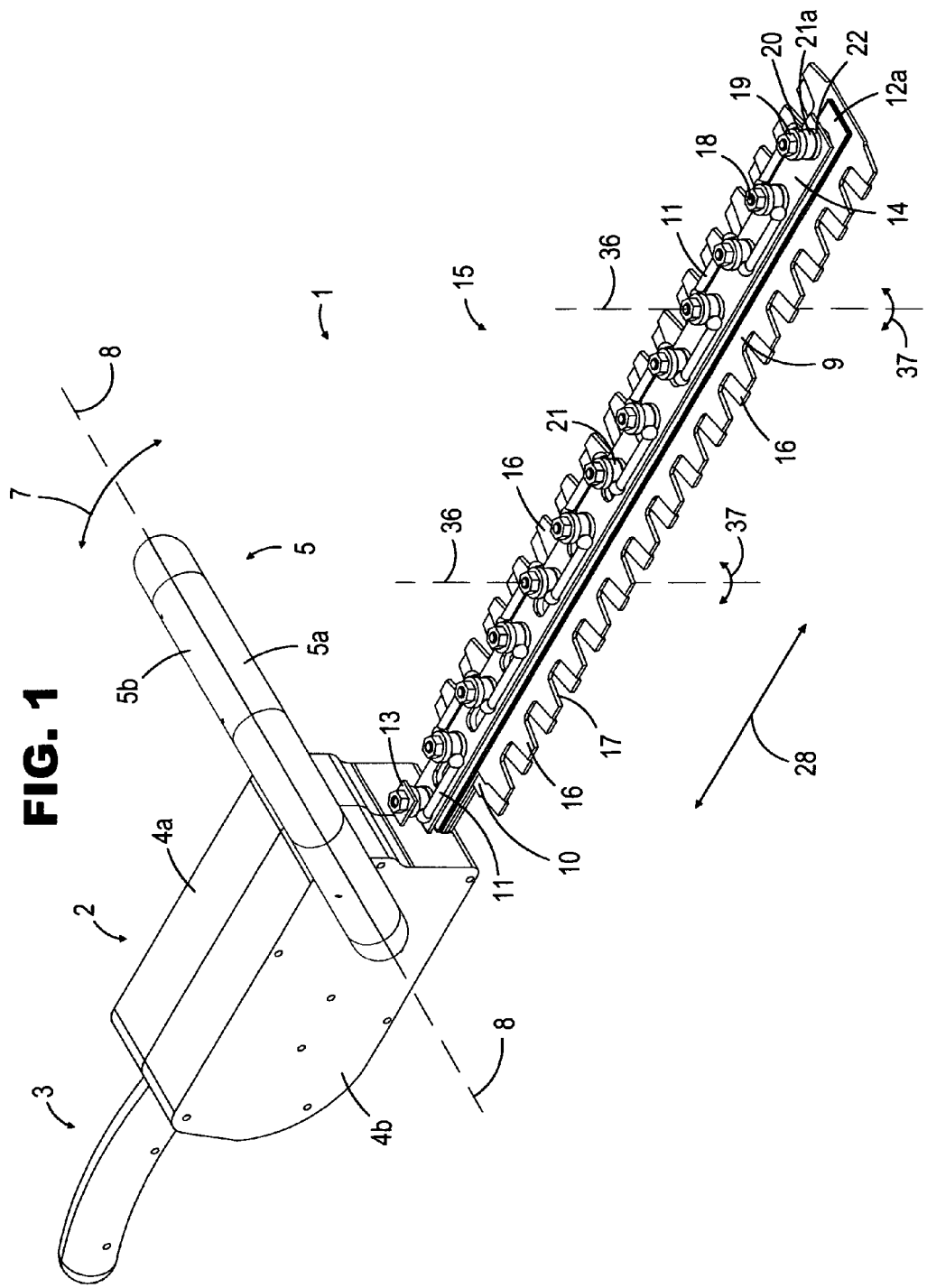
FIG. 1 is a front perspective view of the foliage trimmer having the flexible cutting blade assembly in the linear position.

A foliage trimmer (1) (shown in FIGS. 1-15), having a body (2), made of two relatively symmetrical clamshells (4a, 4b) (as shown in FIGS. 37-42), secured to each other through the openings (190a, 190b) of clamshells (4a, 4b) respectively, via screws (157). A rear handle (3) integrally formed onto the clamshells (4a, 4b). A front handle (5) with curvature adjuster mechanism (6) pivotally mounted to trimmer body (2), and pivotally positional around axis (8), in the direction indicated by arrow (7).

Secured to the clamshells (4a, 4b) of the trimmer body (2) is the flexible cutting blade assembly (15) consisting of a plurality of bolts (18), a flexible mounting plate (24), a lower flexible cutting blade (10) facially engaged with an upper flexible cutting blade (9), a flexible debris cover (26), a plurality of lower spacers (23), a flexible curvature adjusting band (14), a plurality of middle spacers (22), a plurality of rotating connectors (21, 21a), a plurality of linear links (11), a plurality of upper spacers (20), and a plurality of nuts (19).

The flexible mounting plate (24), preferably made of a resiliently flexible steel alloy (but composition is not limited to steel alloys), has a plurality of openings (84), (shown in FIG. 15), formed thereinto. Protruding tabs (83a, 83b) are formed onto the rear end of flexible mounting plate (24). The tabs (83a, 83b) securely fit into recesses (191a, 191b) (shown in FIG. 41, 42), of clamshells (4a, 4b) respectively, and the flexible mounting plate (24) protrudes through openings (188a, 188b) formed into clamshells (4a, 4b) respectively (shown in FIG. 43).

Figure 66:
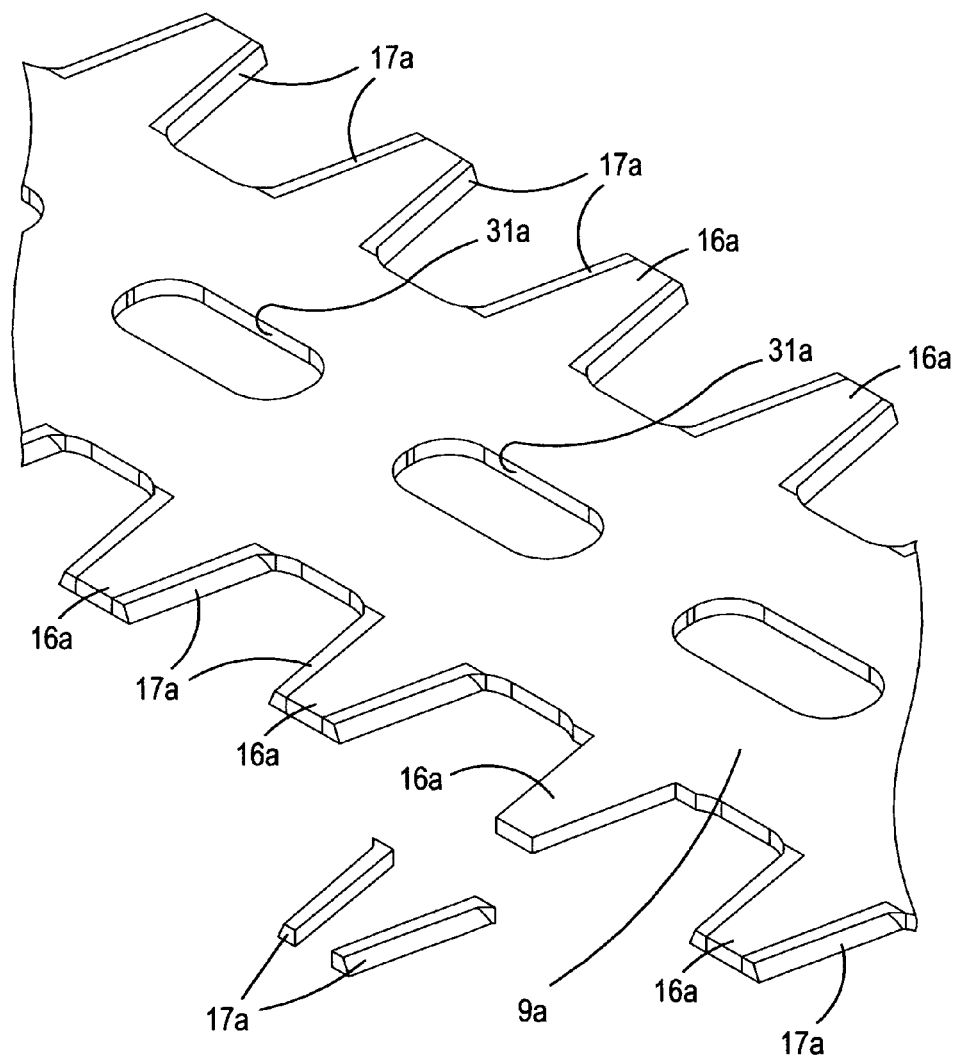
FIG. 66 is a fragmentary view of another flexible cutting blade with two cutting edges separated.

The lower flexible cutting blade (10), preferably made of a resiliently flexible steel alloy (but composition is not limited to steel alloys), having a plurality of longitudinal openings (31) formed thereinto, and a plurality of cutting teeth (16), with cutting edges (17) on each side, formed laterally thereon. Secured to the tang (82) of the lower flexible cutting blade (10) is driving pin (87b) with cylindrical bushing (86b) rotatably mounted thereon and secured in place with a flat retaining ring (85b) in an annular slot (88b) formed into driving pin (87b) (as shown in FIG. 49, 50). The upper flexible cutting blade (9), preferably made of a resiliently flexible steel alloy (but composition is not limited to steel alloys), having a plurality of longitudinal openings (31) formed thereinto, and a plurality of cutting teeth (16), with cutting edges (17) on each side, formed laterally thereon. Secured to the tang (81) of the upper flexible cutting blade (9) is driving pin (87a) with cylindrical bushing (86a) rotatably mounted thereon and secured in place with a flat retaining ring (85a) in an annular slot (88a) formed into driving pin (87a) (as shown in FIG. 49, 50). The tang (82) of the lower flexible cutting blade (10) and the tang (81) of the upper flexible cutting blade (9) are slidably situated inside recesses (207a, 207b, 189a, 189b) formed into clamshells (4a, 4b) respectively and slidably protrude through openings (188a, 188b) formed into clamshells (4a, 4b) respectively (shown in FIG. 43). The upper flexible cutting blade (9) and the lower flexible cutting blade (10) are slidably linearly displaceable in the direction indicated by arrow (28) and the displacement is limited only by movement of the flexible cams (94) or an obstruction in between the cutting teeth (16) of the upper flexible cutting blade (9) and the lower flexible cutting blade (10). Shown in FIG. 66 is an other possible version the upper flexible cutting blade (9) or the lower flexible cutting blade (10). The flexible cutting blade (9a) preferably made of a resiliently flexible steel alloy (but composition is not limited to steel alloys), having a plurality of longitudinal openings (31a) formed thereinto, and a plurality of cutting teeth (16a) formed laterally thereon, with cutting edges (17a) on each side attached thereon. The advantage of this arrangement is that the cutting edges (17a) can be made of a much harder alloy than the flexible cutting blade (9a) therefore allowing the manufacture of a more durable and longer lasting cutting blade (9a).

The flexible debris cover (26) (as shown in FIGS. 59-65) is made of a front debris cover (26c), a plurality of primary and secondary intermediate debris covers (26a, 26b) and a rear debris cover (26d) laminated in between the upper flexible support (12a) and the lower flexible support (12b). The lower flexible support (12b) also serves as support for the upper flexible cutting blade (9). The front debris cover (26c), the intermediate debris covers (26a, 26b) and the rear debris cover (26d), are preferably made of a flexible plastic (but composition is not limited to plastic). The upper flexible support (12a) and the lower flexible support (12b) preferably made of a resiliently flexible steel alloy (but composition is not limited to steel alloys), have a plurality of openings (40) formed thereinto. The size of the openings (40) increase longitudinally from front to back to accommodate the increased distance traveled relative to the lower spacers (23) as the curvature of the flexible cutting blade assembly (15) is adjusted. The front debris cover (26c) (as shown in FIG. 62) is made of foldable plastic. The bottom panel (42) with opening (41) formed therein is connected to front panel (44) via crease (47). The front panel (44) is connected to side panels (45a, 45b) via creases (50a, 50b) respectively. The side panels (45a, 45b) have tabs (54a, 54b) formed thereon respectively. The bottom panel (42) also connected to side panels (43a, 43b) via creases (48a, 48b) respectively. The side panels (43a, 43b) are connected to top panels (46a, 46b) via creases (49a, 49b) respectively. The side panels (43a, 43b) have slits (51a, 51b) formed therein respectively. The left top panel (46a) has a slit (52) formed therein. The right top panel (46b) has a tab (53) formed thereon. The front debris cover (26c) (as shown in FIG. 4, 52) is folded into a trapezoid shape and secured in place with the positioning of tab (53) into slit (52). The front panel (44) is secured in place with the positioning of tabs (54a, 54b) into slits (51a, 51b) respectively. Thereby forming an enclosed space relatively protected from debris. The primary intermediate debris cover (26b) (as shown in FIG. 63) is made of foldable plastic. The bottom panel (62) with opening (41) formed therein is connected to side panels (64a, 64b) via creases (63a, 63b) respectively. The side panels (64a, 64b) are connected to top panels (66a, 66b) via creases (65a, 65b) respectively. The left top panel (66a) has a slit (68) formed therein. The right top panel (66b) has a tab (67) formed thereon. The primary intermediate debris cover (26b) (as shown in FIG. 4, 12) is folded into a trapezoid shape and secured in place with the positioning of tab (67) into slit (68). Thereby forming an enclosed space relatively protected from debris. The secondary intermediate debris cover (26a) (as shown in FIG. 64) is made of foldable plastic. The bottom panel (55) with opening (41) formed therein is connected to side panels (57a, 57b) via creases (56a, 56b) respectively. The side panels (57a, 57b) are connected to top panels (59a, 59b) via creases (58a, 58b) respectively. The left top panel (59a) has a slit (61) formed therein. The right top panel (59b) has a tab (60) formed thereon. The secondary intermediate debris cover (26a) (as shown in FIG. 4, 52) is folded into a trapezoid shape and secured in place with the positioning of tab (60) into slit (61). Thereby forming an enclosed space relatively protected from debris. The size of the openings (41) of the primary and secondary intermediate debris covers (26a, 26b)

increase longitudinally from the front of the flexible cutting blade assembly (15) to back of the flexible cutting blade assembly (15) to accommodate the increased distance traveled relative to the lower spacers (23) as the curvature of the flexible cutting blade assembly (15) is adjusted. The rear debris cover (26d) (as shown in FIG. 65) is made of foldable plastic. The bottom panel (70) with opening (41) formed therein is connected to side panels (72a, 72b) via creases (71a, 71b) respectively. The side panels (72a, 72b) are connected to top panels (74a, 74b) via creases (73a, 73b) respectively. The left top panel (74a) has a slit (76) formed therein. The right top panel (74b) has a tab (75) formed thereon. The rear debris cover (26d) (as shown in FIG. 4, 12) is folded into a trapezoid shape and secured in place with the positioning of tab (75) into slit (76). Thereby forming an enclosed space relatively protected from debris. The primary intermediate debris cover (26b) in its trapezoid shape has a relatively smaller outer diameter than the secondary intermediate debris cover (26a) or the front debris cover (26c) or the rear debris cover (26d) thereby allowing the primary intermediate debris cover (26b) to slide in and out of all the other debris covers (26a, 26c, 26d) and forming an enclosed space relatively protected from debris as the curvature of the flexible cutting blade assembly (15) is adjusted.

As shown in FIG. 52 the narrow portions (23a) (shown in FIG. 58) of the lower spacers (23) penetrate through the openings (40) of the upper flexible support (12a), and through the openings (41) of the debris covers (26a, 26b, 26c, 26d), and through the openings (40) of the lower flexible support (12b), and further penetrate through the longitudinal openings (31) of the upper flexible cutting blade (10) and the lower flexible cutting blade (9), and are securely seated on the flexible mounting plate (24). As shown in FIG. 52 the narrow portion (23a) of the lower spacer (23) is designed to have just enough clearance to slidably accommodate the lower flexible cutting blade (10) facially engaged with the upper flexible cutting blade (9), and the flexible debris cover (26), which also acts as a flexible support for the upper flexible cutting blade (9).

The flexible curvature adjusting band (14), preferably made of a resiliently flexible steel alloy (but composition is not limited to steel alloys), has a plurality of openings (92), (shown in FIG. 15), formed thereinto. The front, outermost opening (92) at the front of the flexible curvature adjusting band (14), having a circular shape, is securely positioned via the front, outermost bolt (18) at the front of the flexible cutting blade assembly (15). The size of the openings (92) increase longitudinally from front to back to accommodate the increased distance traveled relative to the middle spacers (22) as the curvature of the flexible cutting blade assembly (15) is adjusted. The clamp (91) secured with rivets (89) to the rear end of the flexible curvature adjusting band (14) (as shown in FIGS. 15-20) forms an opening (90) that accommodates the cross member (115) of the tubular adjuster member (110) (shown in FIG. 18). As shown in FIG. 52 the narrow portions (22a) (shown in FIG. 57) of the middle spacers (22) penetrate through the openings (92) of the flexible curvature adjusting band (14) and are securely seated on the on tops of the lower spacers (23). The narrow portion (22a) of the middle spacer (22) is designed to have just enough clearance to slidably accommodate the flexible curvature adjusting band (14) as the curvature of the flexible cutting blade assembly (15) is adjusted.

Figure 7:
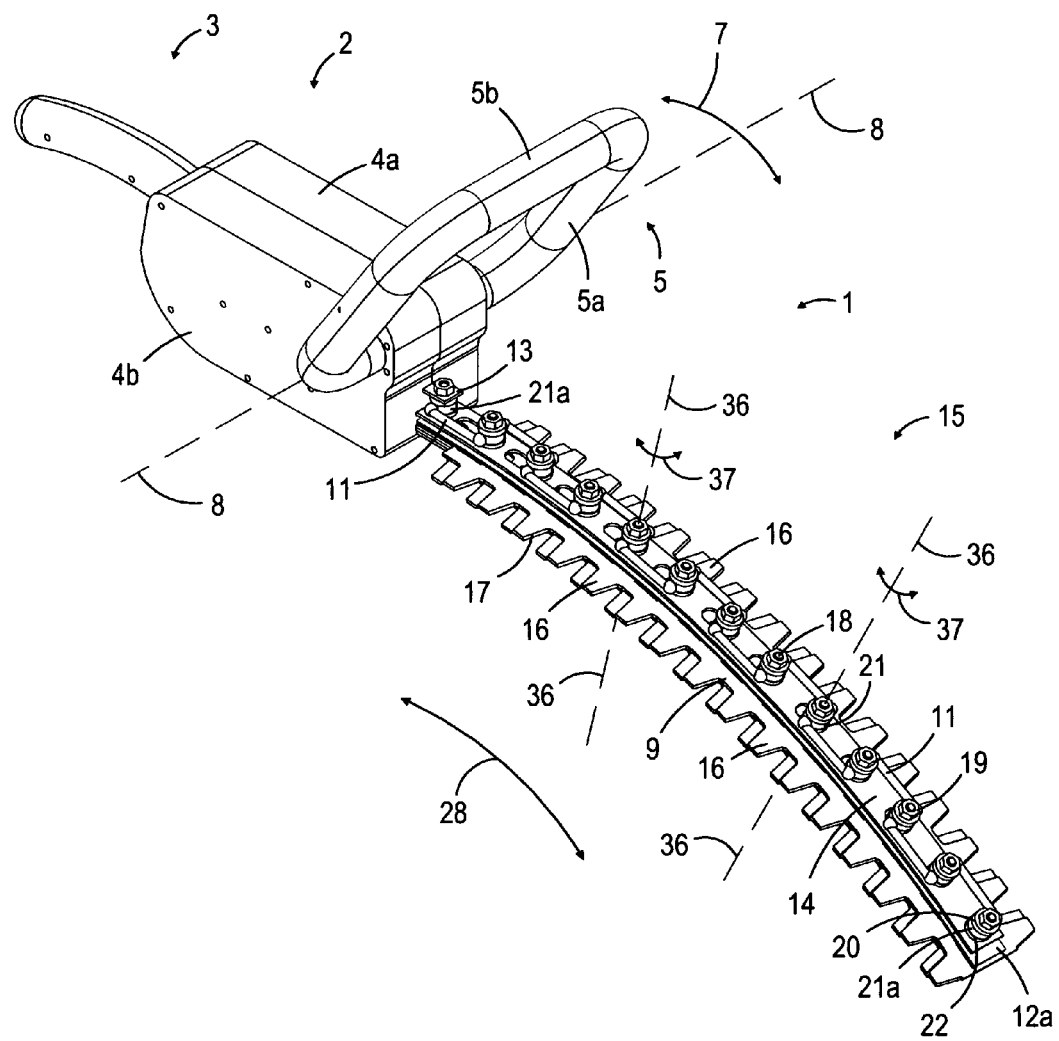
FIG. 7 is a front perspective view of the foliage trimmer having the flexible cutting blade assembly in a convex position.
Figure 8:
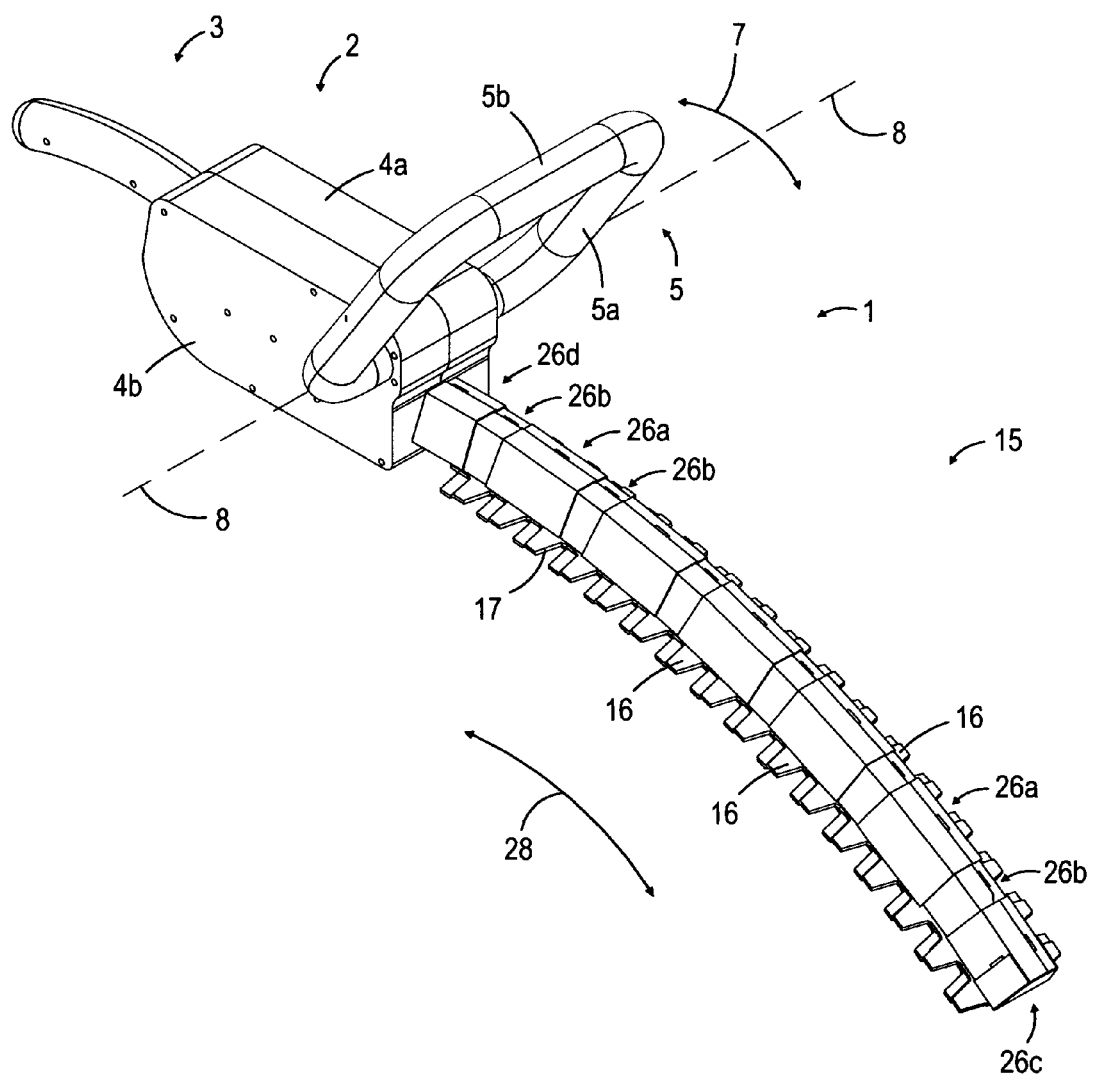
FIG. 8 is a front perspective view of the foliage trimmer having the flexible cutting blade assembly in a convex position with the debris cover attached.
Figure 9:
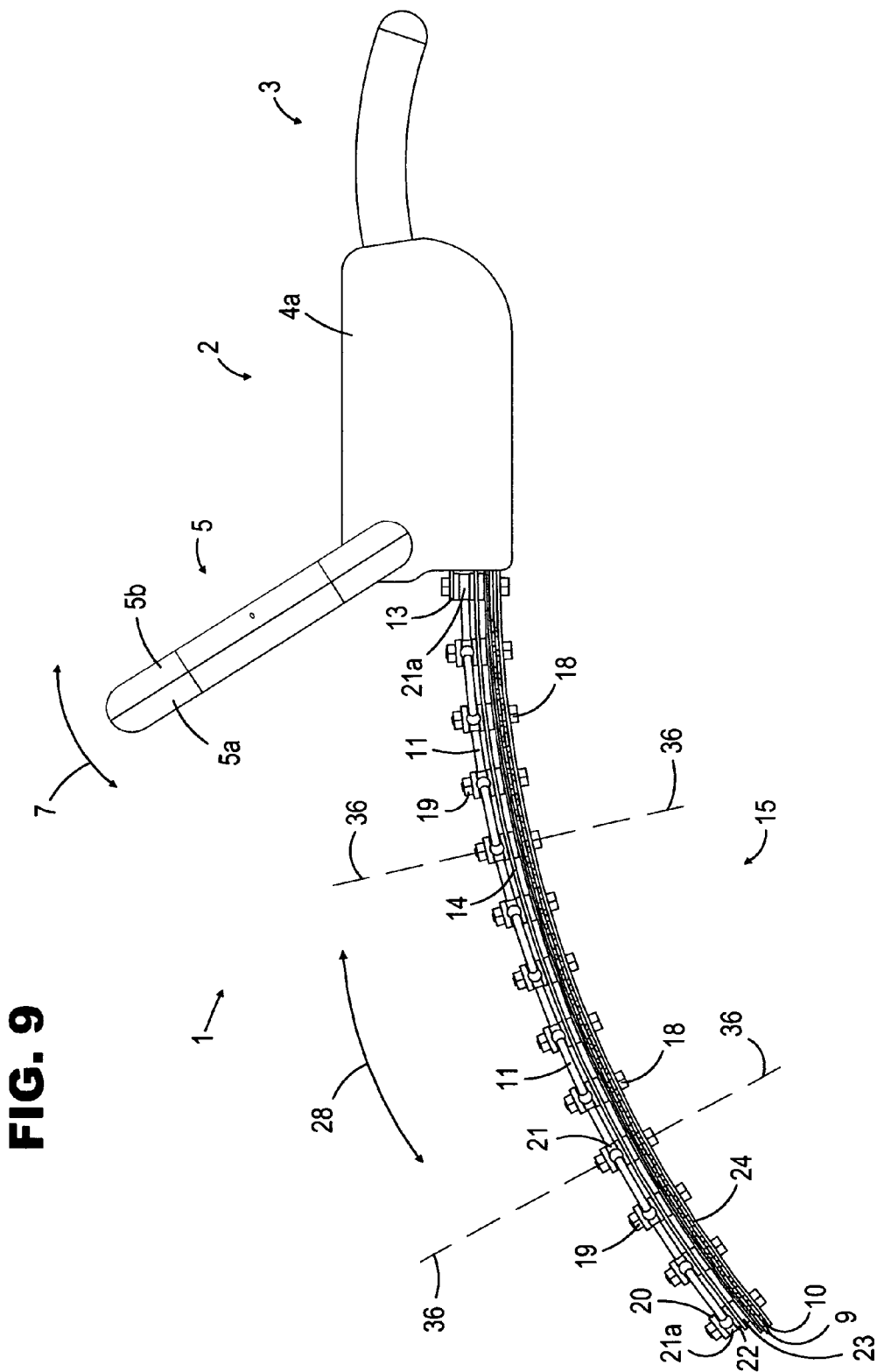
FIG. 9 is a side elevational view of the foliage trimmer having the flexible cutting blade assembly in a convex position.
Figure 10:
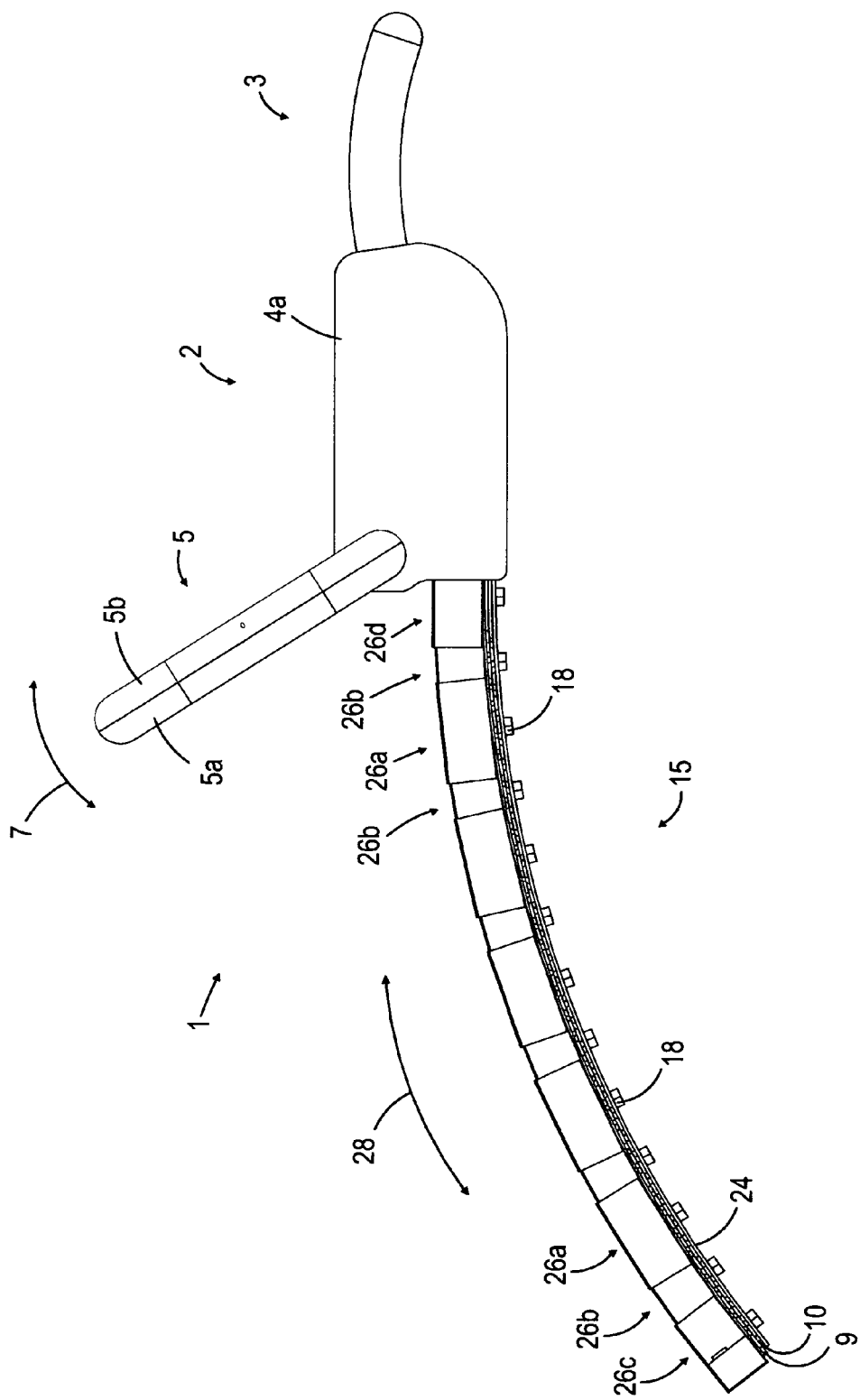
FIG. 10 is a side elevational view of the foliage trimmer having the flexible cutting blade assembly in a convex position with the debris cover attached.
Figure 11:
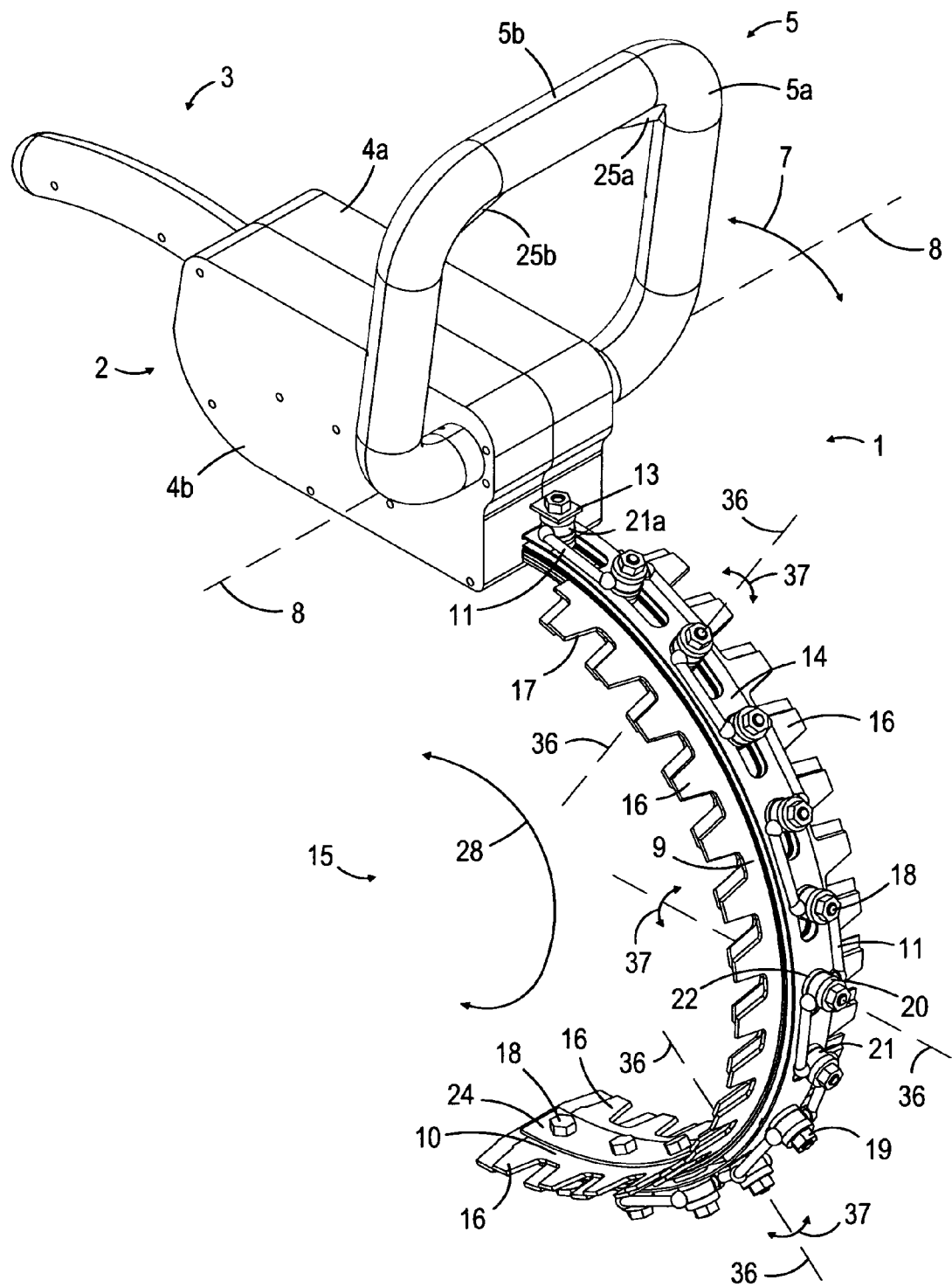
FIG. 11 is a front perspective view of the foliage trimmer having the flexible cutting blade assembly in a semicircle position.
Figure 12:
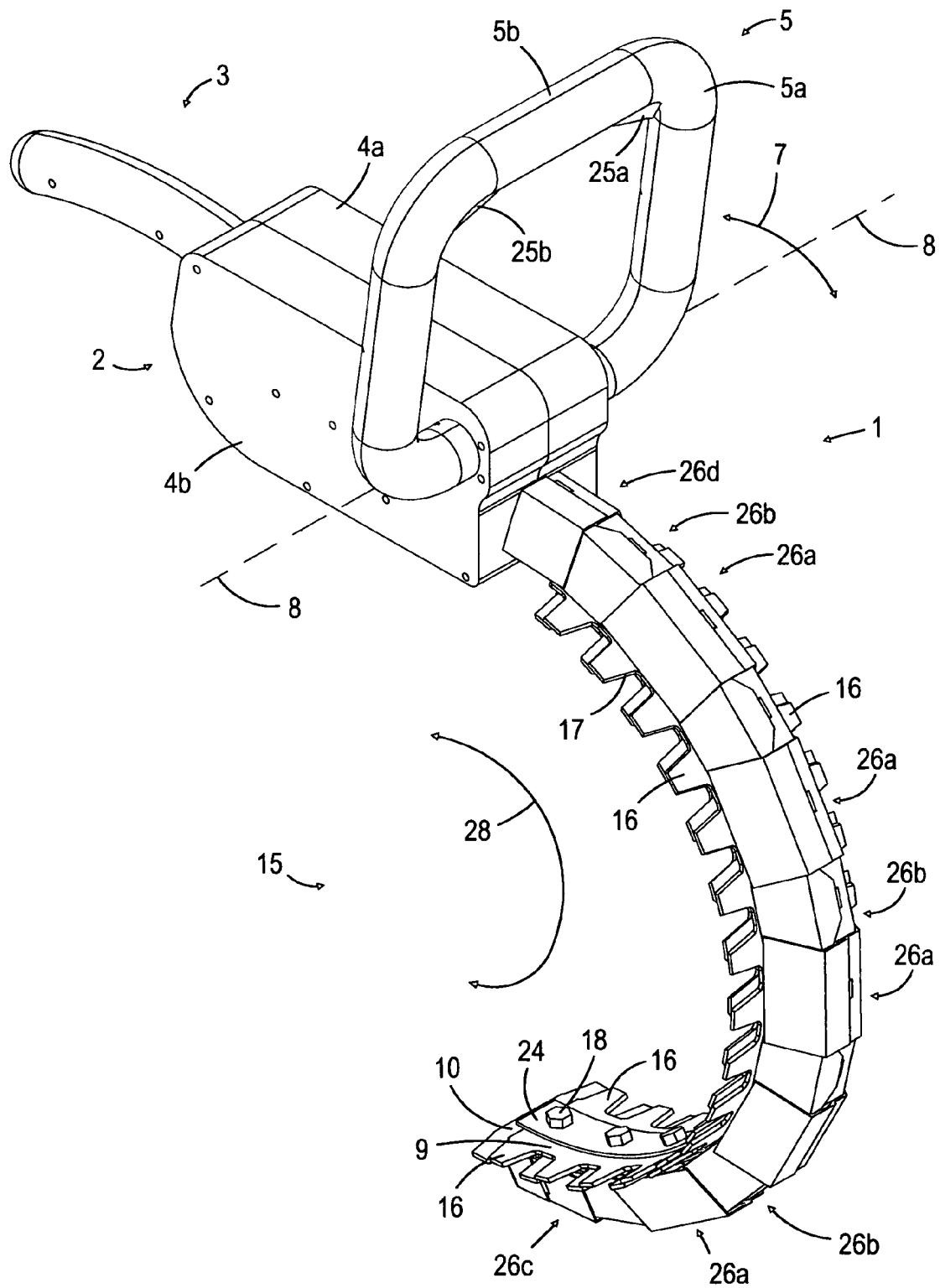
FIG. 12 is a front perspective view of the foliage trimmer having the flexible cutting blade assembly in a semicircle position with the debris cover attached.
Figure 13:
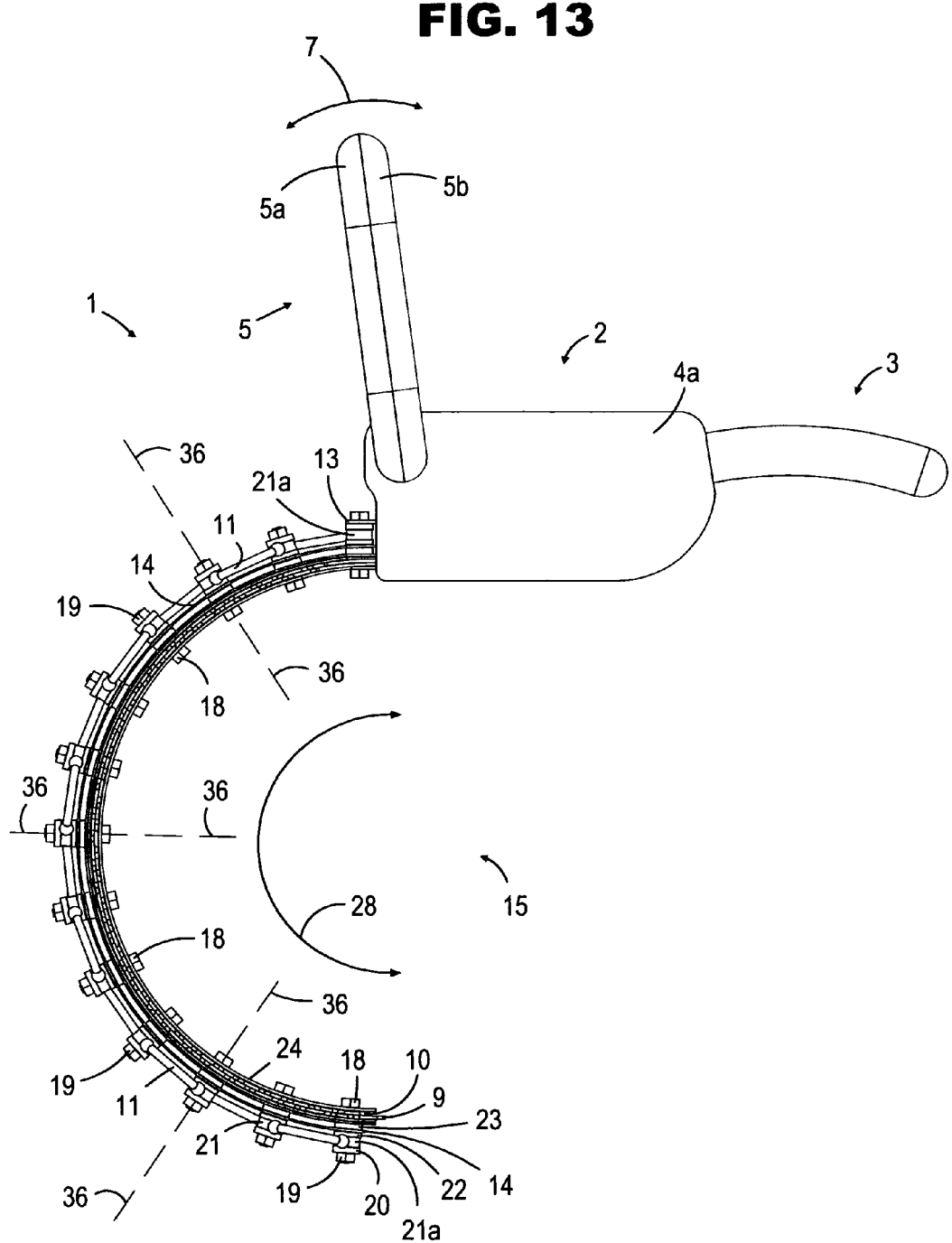
FIG. 13 is a side elevational view of the foliage trimmer having the flexible cutting blade assembly in a semicircle position.
Figure 14:
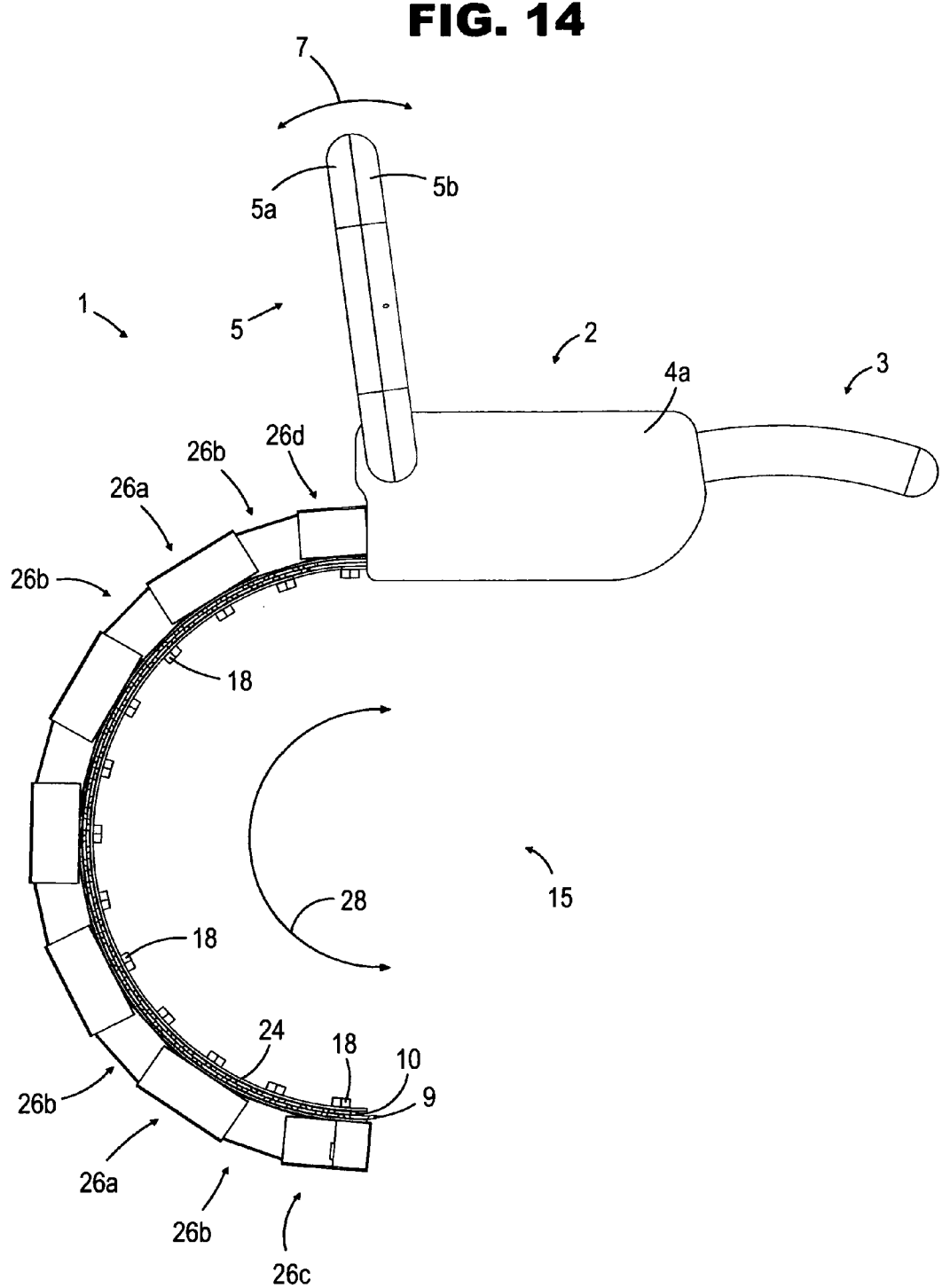
FIG. 14 is a side elevational view of the foliage trimmer having the flexible cutting blade assembly in a semicircle position with the debris cover attached.
Figure 15:
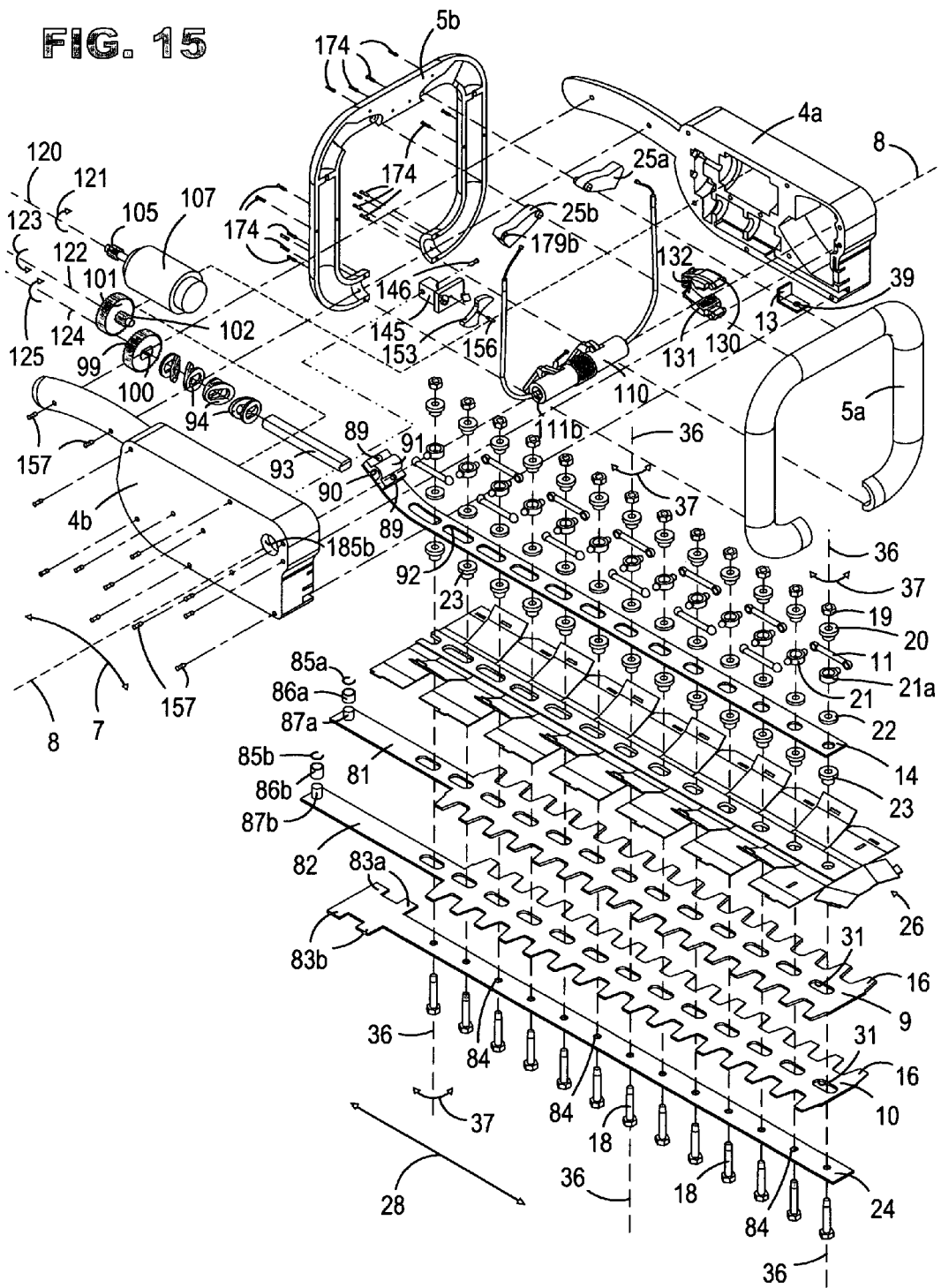
FIG. 15 is an exploded view of the foliage trimmer.
Figure 16:
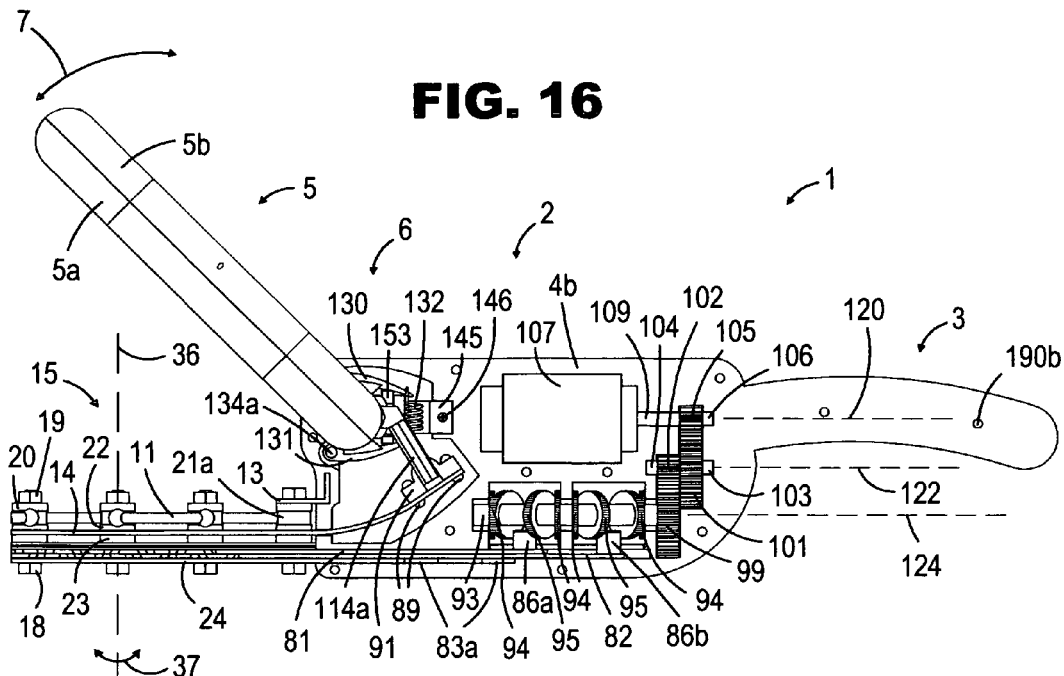
FIG. 16 is a side elevational view of the foliage trimmer body showing the flexible cutting blade assembly in the linear position and without the left housing.
Figure 17:
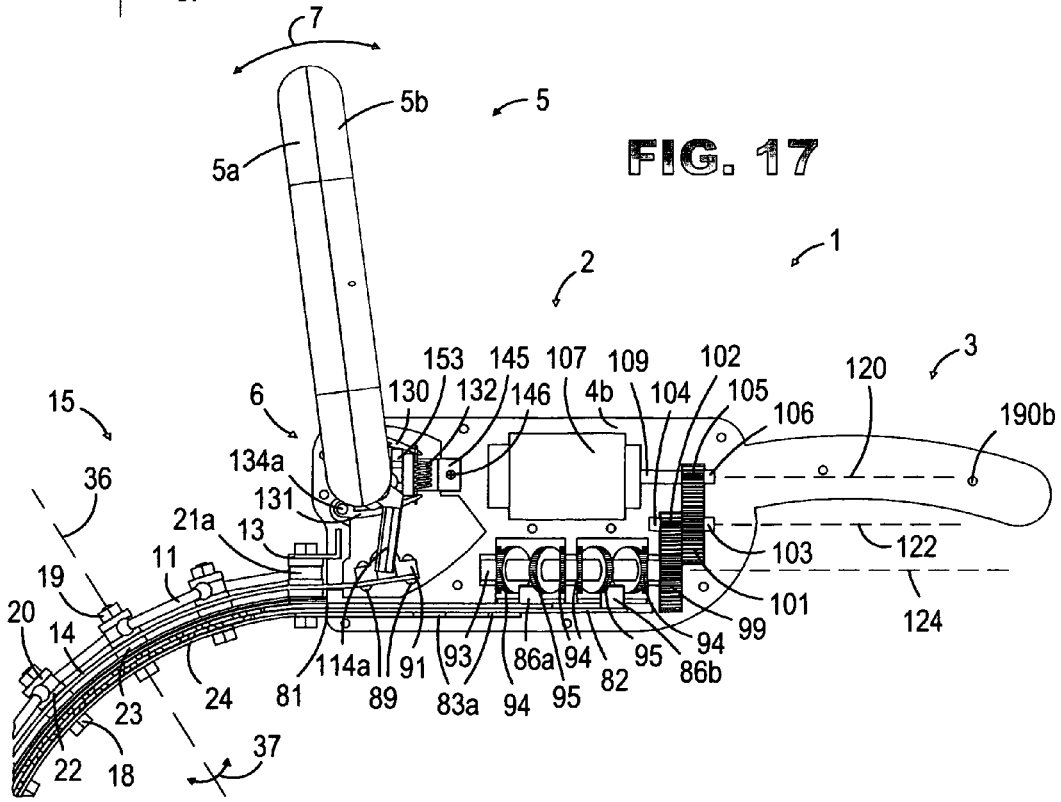
FIG. 17 is a side elevational view of the foliage trimmer body showing the flexible cutting blade assembly in the semi circular position and without the left housing.
Figure 18:
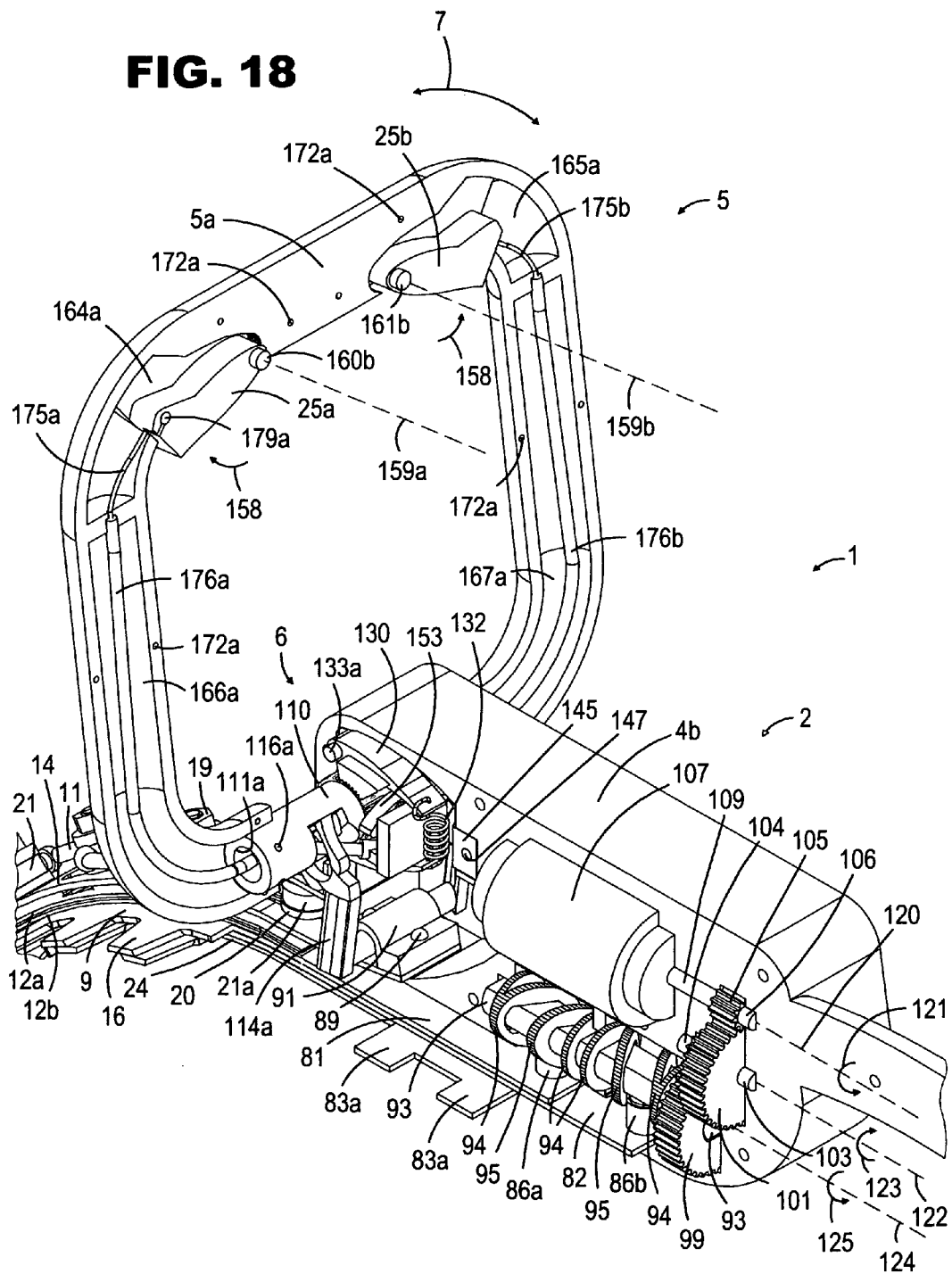
FIG. 18 is a rear perspective view of the foliage trimmer body showing the flexible cutting blade assembly in the semi circular position and without the left housing and without the rear half of the front handle.

The uniform curvature of the flexible cutting blade assembly (15) is maintained by a mechanism consisting of a plurality of rotating connectors (21, 21a) (shown in FIG. 53, 54), having spherical members (29, 29a) formed thereon respectively and connected to sockets (30) of linear links (11) (shown in FIG. 55). The rotating connectors (21, 21a) (as shown in dotted lines in FIG. 51), counter rotate, relative to each other, in unison on axis (36) in the direction indicated by arrow (37) as the curvature of the flexible cutting blade assembly (15) is changed from linear to convex or vice versa. The sockets (30) of linear links (11) slide and rotate on the spherical members (29, 29a) as needed. As shown in FIG. 52 the narrow portions (20a) (shown in FIG. 56) of the upper spacers (20) penetrate through the openings (32, 32a) of the rotating connectors (21, 21a) and are securely seated on the on tops of the middle spacers (22). The narrow portion (20a) of the upper spacer (20) is designed to have just enough clearance to rotatably accommodate the rotating connectors (21, 21a). A plurality of nuts (19) and bolts (18) are used to securely fasten the upper spacers (20), middle spacers (22), and the lower spacers (23) through the openings (33, 34, 35) respectively, and through the openings (84) of flexible mounting plate (24). A bracket (13) (shown in FIG. 15) with opening (39) formed therein, is partially situated inside recesses (186a, 186b) (shown in FIGS. 37-45) of clamshells (4a, 4b) respectively. As shown in FIG. 1, 2, 7, 9, 11, 16, 17, 19, 20, the bracket (13) supports the flexible cutting blade assembly (15) via the contiguous bolt (18). The purpose of the uniform curvature maintainer mechanism is to maintain equidistant spacing between the bolt (18) axes (36) to prevent the distortion of the flexible cutting blade assembly (15) in its linear position and to facilitate the formation of a uniform curvature of the flexible cutting blade assembly (15). The uniform curvature maintainer mechanism conforms to a convex shape as the flexible cutting blade assembly (15) is adjusted (as shown in FIG. 7, 9, 11, 13, 17, 51).

The motor (107) (shown in FIGS. 16-20) is securely encased in recesses (193a, 193b) (shown in FIGS. 37-42) formed into clamshells (4a, 4b) respectively of body (2). The motor (107) can be electric and be powered by rechargeable batteries (not shown) or electricity from electric-main (not shown) or from an electricity generator (not shown). The foliage trimmer (1) can also be powered by a gasoline engine (not shown) or compressed air generated by an air compressor (not shown). Also not depicted and not described are the on-off switch, including the conventional dual switching mechanism which is customary on such equipment to ensure the safe operation of the equipment, and the electrical wiring and other electrical and mechanical components which are necessary for the proper operation of the foliage trimmer (1), but are well known to those skilled in the art. The motor (107) is connected to the rotatable drive shaft (109) with gear (105) formed thereon. The drive shaft (109), the gear (105) and the end-shaft (106), are rotatably situated in recesses (194a, 194b, 195a, 195b, 196a, 196b) respectively, formed into clamshells (4a, 4b) respectively. The transfer gear (101) has an end-shaft (103) formed on one side, and a smaller gear (102) with an end-shaft (104) formed on the other side. The end-shaft (103), the transfer gear (101), the small gear (102), and the end-shaft (104), are rotatably situated in recesses (199a, 199b, 197a, 197b, 198a, 198b, 200a, 200b) respectively, formed into clamshells (4a, 4b) respectively. The camshaft (93) (shown in FIGS. 15-20) attached to gear (99) via opening (100). The gear (99) is rotatably situated in recesses (201a, 201b) formed into clamshells (4a, 4b) respectively. The camshaft (93) is rotatably situated in recesses (202a, 202b, 204a, 204b, 206a, 206b) formed into clamshells (4a, 4b) respectively.

The camshaft (93) transverses two sets of two opposing resilient flexible cams (94) through their openings (96) (shown FIG. 18, 43-45). As the motor (107) rotates the gear (105) on rotational axis (120) in the direction indicated by arrow (121) and creates an opposite rotational motion, indicated by arrow (123) on rotational axis (122), in transfer gear (101) and further creates a rotational motion indicated by arrow (125) on rotational axis (124) in camshaft gear (99). As the camshaft (93) rotates the two sets of two opposing resilient flexible cams (94), in cavities (203a, 203b, 205a, 205b) formed into clamshells (4a, 4b) respectively, on rotational axis (124), the rotational motion is transferred into counter reciprocating linear motion, through the cylindrical bushings (86a, 86b) engagingly riding in between the two opposing faces (97) of the resilient flexible cams (94) and causing the driving pins (87a, 87b) attached to tangs (81, 82) of the flexible cutting blades (9, 10) respectively, to counter reciprocate along arrow (28), thus severing any leaves or branches that are positioned in between the teeth (16) of the upper flexible cutting blade (9) and the lower flexible cutting blade (10). In order to prevent any damage to the foliage trimmer (1) caused by the accidental positioning of metallic or other hard non-foliage objects in between the teeth (16) of the upper flexible cutting blade (9) and the lower flexible cutting blade (10), that the foliage trimmer (1) is not design to cut, therefore resilient flexible cams (94) are provided with resiliently flexible members (95) that flex and deflect in the direction indicated by arrow (98) (shown in FIGS. 45-48), when an obstacle is encountered between the teeth (16) of the upper flexible cutting blade (9) and the lower flexible cutting blade (10), thus allowing the rotation of the camshaft (93) to proceed without causing any damage to the foliage trimmer (1). And the foliage trimmer (1) operator is given a chance to remove the obstacle and continue the foliage trimming process without having to repair the foliage trimmer (1). The resilient flexible cams (94) are designed and formed from materials that allow flexing and deflecting of the resiliently flexible members (95) only when a resistance force greater than what is required to cut normal foliage is transferred through the teeth (16) of the flexible cutting blades (9, 10) and through the tangs (81, 82) respectively, and through the cylindrical bushings (86a, 86b) respectively, and via face (97) to the resiliently flexible member (95) of the resilient flexible cam (94).

The curvature adjuster mechanism (6), consisting of a tubular adjuster member (110) as shown in FIGS. 15-23 is rotatably situated through openings (185a, 185b) of clamshells (4a, 4b) respectively. The tubular adjuster member (110) is situated in the cavities (180a, 180b) of clamshells (4a, 4b) respectively. The tubular adjuster member (110) having openings (111a, 111b) and openings (112a, 112b) formed therewithin to accommodate the flexible release cable sleeves (176a, 176b) therethrough (shown in FIG. 23), and a gear (113) is formed thereon. The cross member (115) connected to arms (114a, 114b) integrally formed onto tubular adjuster member (110). The two relatively symmetrical clamshells (5a, 5b) of the front handle (5) are secured to each other with screws (174) through openings (172a, 172b) (shown in FIG. 34, 35) and securely attached to the outermost protruding ends of the tubular adjuster member (110) with screws (174) through openings (173) into openings (116a, 116b) of the tubular adjuster member (110). The clamshells (5a, 5b) of the front handle (5) have four symmetrical recesses (164a, 164b and 165a, 165b) respectively, and have four tubular recesses (162a, 162b and 163a, 163b) respectively formed therewithin to pivotally accommodate the pins (160a, 160b and 161a, 161b) (shown in FIG. 23), formed onto the two release levers (25a, 25b) respectively. The release levers (25a, 25b) are pivotally displaceable around pivot axes (159a, 159b) respectively in the directions indicated by arrows (158). The two release levers (25a, 25b) have recesses (179a, 179b) respectively formed therewithin to securely accommodate the upper terminating caps (177a, 177b) respectively of the release wires (175a, 175b) respectively. The top ends of the flexible release cable sleeves (176a, 176b) are secured into recesses (170a, 170b and 171a, 171b) respectively, and the release wires (175a, 175b) are allowed to freely slide through recesses (168a, 168b and 169a, 169b) respectively while the flexible release cable sleeves (176a, 176b) are freely situated within the cavities formed from symmetrical recesses (166a, 166b and 167a, 167b) respectively. The bottom ends of the flexible release cable sleeves (176a, 176b) are secured into recesses (149a, 149b) (shown in FIG. 30-33) respectively of cable sleeve holders (148a, 148b) respectively that are integrally formed onto cable support member (145) and the release wires (175a, 175b) are allowed to freely slide through openings (151a, 151b). The cable support member (145) is secured into recess (181) with screw (146) through opening (147) and into opening (182).

Figure 26:
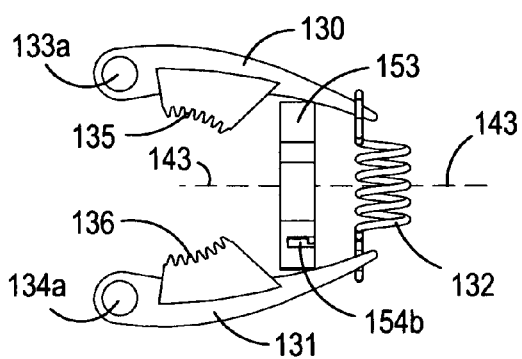
FIG. 26 is a side elevational view showing the restraining mechanism in the locked position.
Figure 27:
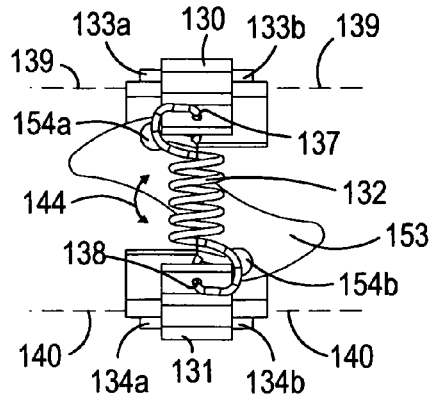
FIG. 27 is a rear elevational view showing the restraining mechanism in the locked position.
Figure 28:
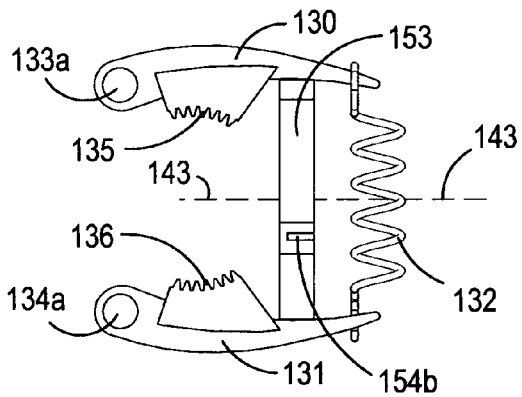
FIG. 28 is a side elevational view showing the restraining mechanism in the unlocked position.
Figure 29:
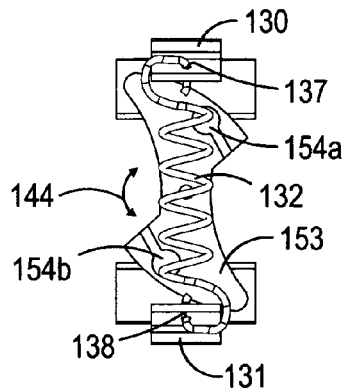
FIG. 29 is a rear elevational view showing the restraining mechanism in the unlocked position.
Figure 30:
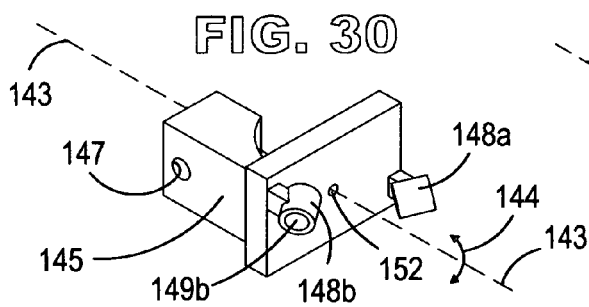
FIG. 30 is a rear perspective view of the cable supporting member.
Figure 31:
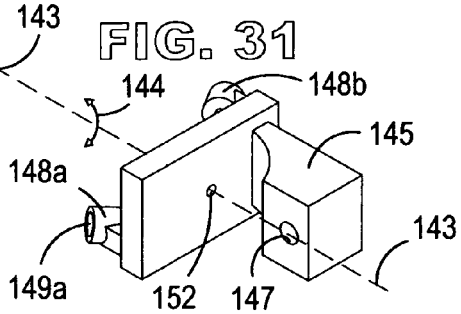
FIG. 31 is a front perspective view of the cable supporting member.
Figure 32:
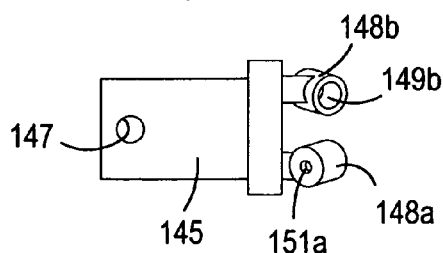
FIG. 32 is a right side elevational view of the cable supporting member.
Figure 33:
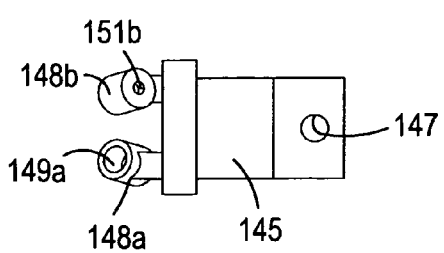
FIG. 33 is a left side elevational view of the cable supporting member.
Figure 61:
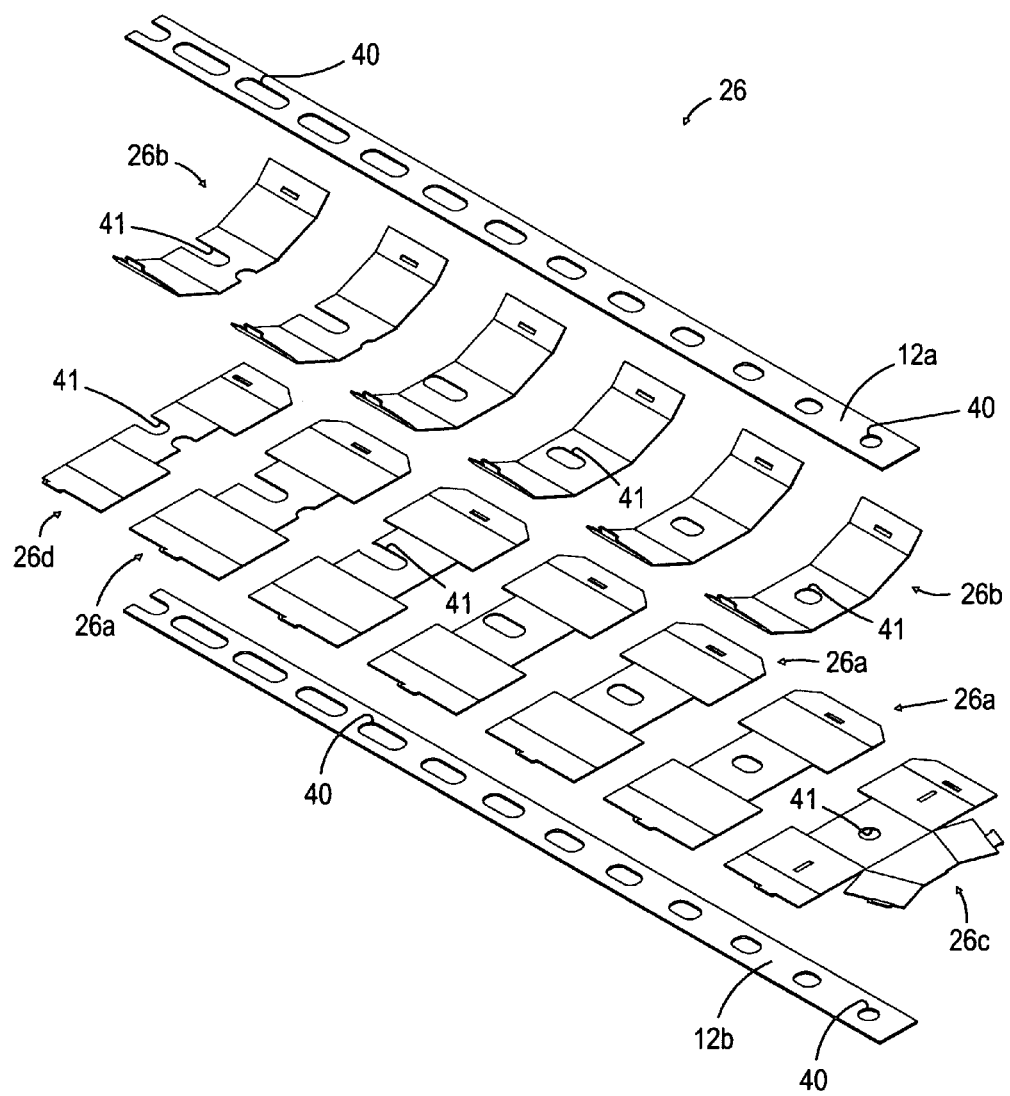
FIG. 61 is an exploded view of the debris cover in the unfolded position.

A pair of opposing restraining arms (130, 131) (shown in FIG. 15, 19, 20, 22, 26-29) with concave gear teeth faces (135, 136) respectively formed thereon, and via their two pins (133a, 133b and 134a, 134b) respectively, are pivotally situated within two sets of two tubular recesses (183a, 183b and 184a, 184b) (shown in FIG. 41, 42), respectively formed into clamshells (4a, 4b) respectively. The restraining arms (130, 131) (shown in FIG. 22), are pivotable around pivot axes (139, 140) respectively in the direction indicated by arrows (141, 142) respectively. The resiliently restraining spring (132) through openings (137, 138) of the opposing restraining arms (130, 131) respectively, exerts a restraining force and forces the opposing restraining arms (130, 131) towards the gear teeth of gear (113) to maintain a locked and secured condition of the curvature adjuster mechanism (6) as shown in FIG. 19, 26, 27, thereby securing the curvature of the flexible cutting blade assembly (15). A rotating separator member (153) (shown in FIG. 15, 19, 20, 24-29), situated in between and abutting the inner side of the opposing restraining arms (130, 131) is rotatably mounted with screw (156) through opening (155) into opening (152) of cable support member (145). This rotating separator member (153) has recesses (154a, 154b) formed therewithin to securely accommodate the lower terminating caps (178a, 178b) (shown in FIG. 23) respectively of the release wires (176a, 176b) respectively.

The curvature of the flexible cutting blade assembly (15) is adjusted with one hand on the front handle (5) of the curvature adjusting mechanism (6) and the other hand on rear handle (3) with fingers engagingly pushing on at least one of the release levers (25a, 25b), and displacing them around pivot axes (159a, 159b) respectively, (as shown in FIG. 36 the displaced release lever (25a)), thereby engagingly pulling on at least one of the release wires (175a, 175b) and causing the rotating separator member (153) to rotate around axis (143) (in the direction indicated by arrow (144)) and displace the opposing restraining arms (130, 131) around pivot axes (139, 140) respectively, away from tubular adjuster member (110) as shown in FIG. 20, 28, 29 and disengaging the gear teeth faces (135, 136) of restraining arms (130, 131) respectively from gear (113) of tubular adjuster member (110), thereby allowing free movement of the curvature adjusting mechanism (6) around pivot axis (8) in the direction indicated by arrow (7).

To change the curvature of the flexible cutting blade assembly (15), from linear (shown in FIG. 16) to convex (shown in FIG. 17), A movement applied with one hand to the front handle (5) of the curvature adjuster mechanism (6) in direction indicated by arrow (7) will translate into an opposite movement of the flexible curvature adjuster band (14) attached to the cross member (115) connected to arms (114a, 114b) of the tubular adjuster member (110) with a clamp (91) and rivets (89), thereby causing the flexible cutting blade assembly (15) to change its shape from linear to convex and vice versa. The flexible curvature adjuster band (14), slidably through openings (187a, 187b) of clamshells (4a, 4b) respectively, causing the curvature of the flexible cutting blade assembly (15) to change to the desired convex shape that is needed to properly trim the foliage. When the desired curvature of the flexible cutting blade assembly (15) is established, with the release of the depressed release lever (25a or 25b) of front handle (5), disengaging the engaged release wire (175a or 175b) respectively, and causing the resiliently restraining spring (132) through openings (137, 138) of the opposing restraining arms (130, 131) respectively to pull the opposing restraining arms (130, 131) towards the gear (113) of tubular adjuster member (110) and engaging the gear teeth faces (135, 136) of restraining arms (130, 131) respectively thereto, and causing the rotating separator member (153) to return to its original position, thereby securing the curvature of the flexible cutting blade assembly (15) into the desired fixed position. And to change the curvature of the flexible cutting blade assembly (15) from convex to linear, the front handle (5) is pivoted around pivot axis (8) towards the front of the hedge trimmer (1) thereby changing the curvature of the flexible cutting blade assembly (15) from convex to linear.

Figure 67:
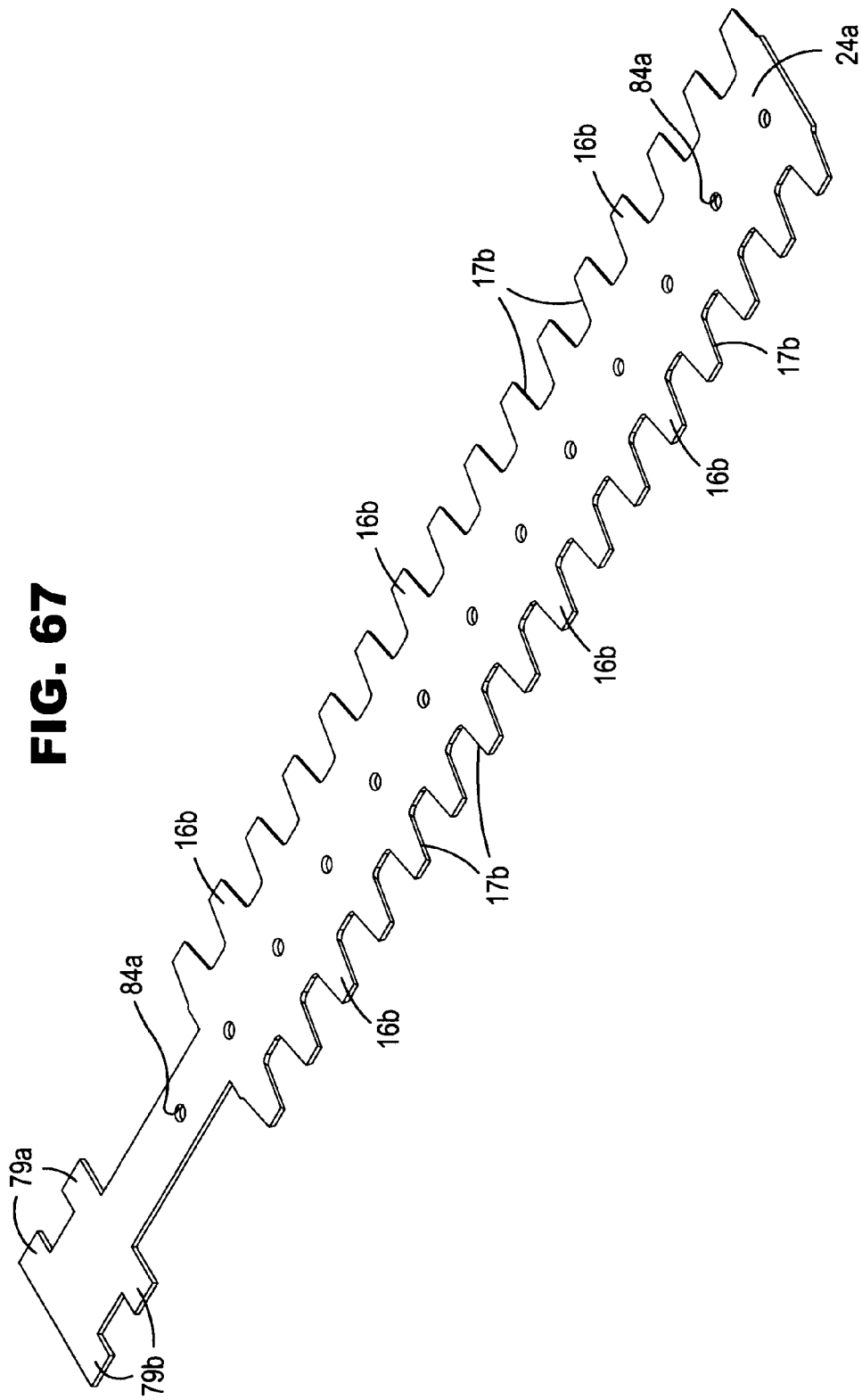
FIG. 67 is a perspective view of a flexible mounting plate with a stationary cutting blade integrally formed thereon.

Depicted in FIG. 67 is a flexible mounting plate (24a), with stationary cutting blade integrally formed thereon, preferably made of a resiliently flexible steel alloy (but composition is not limited to steel alloys), has a plurality of openings (84a) formed thereinto. Protruding tabs (79a, 79b) are formed onto the rear end of the flexible mounting plate (24a) and a plurality of cutting teeth (16b), with cutting edges (17b) on each side, formed laterally thereon. The flexible mounting plate (24a), with stationary cutting blade integrally formed thereon is part of a foliage trimmer (not shown), similar to foliage trimmer (1) in all respects except it only has one reciprocating flexible cutting blade, similar to the upper flexible cutting blade (9), and the camshaft, similar to camshaft (93), transverses only one set of two opposing resilient flexible cams (94) through their openings (96). Also in this foliage trimmer the narrow portion (23a) of the lower spacer (23) is designed to have just enough clearance to slidably accommodate the reciprocating flexible cutting blade facially engaged with the flexible mounting plate (24a), with stationary cutting blade integrally formed thereon, and the flexible debris cover (26), which also acts as a flexible support for the flexible cutting blade (9). The bottom of the lower spacer (23) is securely seated on top of the flexible mounting plate (24a), with stationary cutting blade integrally formed thereon.

Thus there has been described a novel foliage trimmer that will hopefully alleviate the arduous and time consuming foliage trimming.

I claim:

1. A foliage trimmer comprising:
   a trimmer body made of two clamshells with a rear handle integrally formed onto the trimmer body;
   a motor means;
   a drive mechanism means;
   a handle mechanism means pivotally mounted to said trimmer body;
   a restraining mechanism means;
   a flexible cutting blade assembly with an adjustable curvature further comprising a flexible mounting plate, a flexible upper cutting blade, a flexible lower cutting blade, a flexible band having longitudinally extending openings, a flexible debris cover means, a curvature maintainer mechanism means consisting of a plurality of rotating connectors and linear links, a plurality of bolts including an outermost bolt situated farthest from said body, a plurality of spacers, and a plurality of nuts;
   said flexible band is clamped to said handle mechanism means, projects through said trimmer body, and secured to said outermost bolt;
   said flexible mounting plate has a plurality of openings and is attached to said trimmer body;
   said flexible upper cutting blade and said flexible lower cutting blade each have a plurality of longitudinally extending openings and a plurality of cutting teeth with cutting edges thereon;
   said flexible upper cutting blade and said flexible lower cutting blade are linearly counter reciprocated by said drive mechanism means which is operatively connected to said motor means;
   said drive mechanism comprises a rotatable camshaft and two sets of two opposing resilient flexible cams, wherein the two sets of two opposing resilient flexible cams are positioned on a rotatable camshaft;
   said flexible cutting blade assembly's curvature is adjustable by movement of said flexible band and said handle mechanism means;
   said flexible cutting blade assembly's curvature is secured by said restraining mechanism means;
   said flexible cutting blade assembly is connected to said trimmer body by said curvature maintainer mechanism means;
   said flexible cutting blade assembly is fastened together by said plurality of bolts, said plurality of spacers, and said plurality of nuts; and
   said flexible debris cover means also serves as a support for said flexible upper cutting blade.

2. The foliage trimmer as set forth in claim 1 wherein said flexible upper cutting blade and said flexible lower cutting blade each comprise body portions, wherein said cutting teeth with cutting edges of both said flexible upper cutting blade and said flexible lower cutting blade are made of a substantially harder and more durable material than said body portions.

3. A foliage trimmer comprising:
   a trimmer body made of two clamshells with a rear handle integrally formed onto the trimmer body;
   a motor means;
   a drive mechanism means;
   a handle mechanism means pivotally mounted to said trimmer body;
   a restraining mechanism means;
   a flexible cutting blade assembly with an adjustable curvature further comprising a flexible mounting plate, a flexible cutting blade, a flexible band having longitudinally extending openings, a flexible debris cover means, a curvature maintainer mechanism means consisting of a plurality of rotating connectors and linear links, a plurality of bolts including an outermost bolt situated farthest from said body, a plurality of spacers, and a plurality of nuts;
   said flexible band is clamped to said handle mechanism means, projects through said trimmer body, and secured to said outermost bolt;
   said flexible mounting plate is attached to said trimmer body and comprises a plurality of longitudinally extending openings and a plurality of cutting teeth with cutting edges such that the flexible mounting plate acts as a stationary cutting blade;

said flexible cutting blade further comprises a plurality of longitudinally extending openings and a plurality of cutting teeth with cutting edges thereon;

said flexible cutting blade is linearly counter reciprocated by said drive mechanism means which is operatively connected to said motor means;

said drive mechanism comprises a rotatable camshaft and two sets of two opposing resilient flexible cams, wherein the two sets of two opposing resilient flexible cams are positioned on a rotatable camshaft;

said flexible cutting blade assembly's curvature is adjustable by movement of said flexible band and said handle mechanism means;

said flexible cutting blade assembly's curvature is secured by said restraining mechanism means;

said flexible cutting blade assembly is connected to said trimmer body by said curvature maintainer mechanism means;

said flexible cutting blade assembly is fastened together by said plurality of bolts, said plurality of spacers, and said plurality of nuts; and said flexible debris cover means also serves as a support for said flexible cutting blade.

4. The foliage trimmer as set forth in claim 3 wherein said flexible cutting blade and said flexible mounting plate each comprise body portions wherein said cutting teeth with cutting edges of both said flexible cutting blade and said flexible mounting plate are made of a substantially harder and more durable material than said body portions.

* * * * *